(12) United States Patent
Mair et al.

(10) Patent No.: US 11,472,556 B2
(45) Date of Patent: Oct. 18, 2022

(54) GALLEY SYSTEMS FOR AN INTERNAL CABIN OF A VEHICLE

(71) Applicant: THE BOEING COMPANY, Chicago, IL (US)

(72) Inventors: Roland D. Mair, Kenmore, WA (US); Michael J. Figlenski, Renton, WA (US); Nathan M. Morea, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 384 days.

(21) Appl. No.: 16/598,067

(22) Filed: Oct. 10, 2019

(65) Prior Publication Data

US 2021/0107655 A1    Apr. 15, 2021

(51) Int. Cl.
*B64D 11/04* (2006.01)
*B64D 11/02* (2006.01)
*B64D 11/00* (2006.01)

(52) U.S. Cl.
CPC .......... *B64D 11/04* (2013.01); *B64D 11/0007* (2013.01); *B64D 11/02* (2013.01)

(58) Field of Classification Search
CPC .............................. B64D 11/04; B64D 11/0007
See application file for complete search history.

(56) References Cited

U.S. PATENT DOCUMENTS

| | | | |
|---|---|---|---|
| 9,079,668 B2 * | 7/2015 | Gee ........................ | B64D 11/04 |
| 9,302,772 B2 * | 4/2016 | Boren ..................... | B64D 11/02 |
| 9,382,005 B2 * | 7/2016 | Schliwa .............. | B64D 11/0691 |
| 9,567,083 B2 * | 2/2017 | Saeltzer ................. | B64D 11/04 |
| 9,708,063 B2 * | 7/2017 | Koyama ................ | B64D 11/02 |
| 9,738,387 B2 * | 8/2017 | Holtorf .................. | B64D 11/04 |
| 10,399,681 B2 * | 9/2019 | Seibt .................... | B64D 11/0605 |
| 10,583,925 B2 * | 3/2020 | McIntosh ............... | B64D 11/04 |
| 2013/0206904 A1 * | 8/2013 | Gee ........................ | B64D 11/04 244/118.5 |
| 2014/0034782 A1 * | 2/2014 | Saeltzer ................. | B64D 11/04 244/118.5 |
| 2014/0048650 A1 * | 2/2014 | Schliwa ................. | B64D 11/04 244/118.5 |
| 2014/0353425 A1 * | 12/2014 | Boren, Jr. .............. | B64D 11/04 244/118.5 |
| 2015/0314872 A1 * | 11/2015 | Holtorf .................. | B64D 11/04 244/118.5 |
| 2016/0236785 A1 * | 8/2016 | McIntosh ............... | B64D 11/00 |
| 2017/0129612 A1 * | 5/2017 | Seibt .................... | B64D 11/0691 |
| 2020/0307794 A1 * | 10/2020 | Sarraf .................... | H02J 7/0042 |

FOREIGN PATENT DOCUMENTS

| | | | | |
|---|---|---|---|---|
| CN | 106660637 B | * | 6/2020 | ........ B64D 11/0605 |
| WO | WO-2020028495 A1 | * | 2/2020 | ........ B64D 11/0007 |

* cited by examiner

*Primary Examiner* — Philip J Bonzell
(74) *Attorney, Agent, or Firm* — The Small Patent Law Group LLC; Joseph M. Butscher

(57) ABSTRACT

A galley system within an internal cabin of an aircraft includes one or more inboard cart compartments that are configured to removably retain one or more first galley carts, and one or more outboard cart compartments. The outboard cart compartment(s) are configured to removably retain one or more second galley carts. The inboard cart compartment(s) extend forwardly and/or rearwardly in relation to the outboard cart compartment(s).

31 Claims, 27 Drawing Sheets

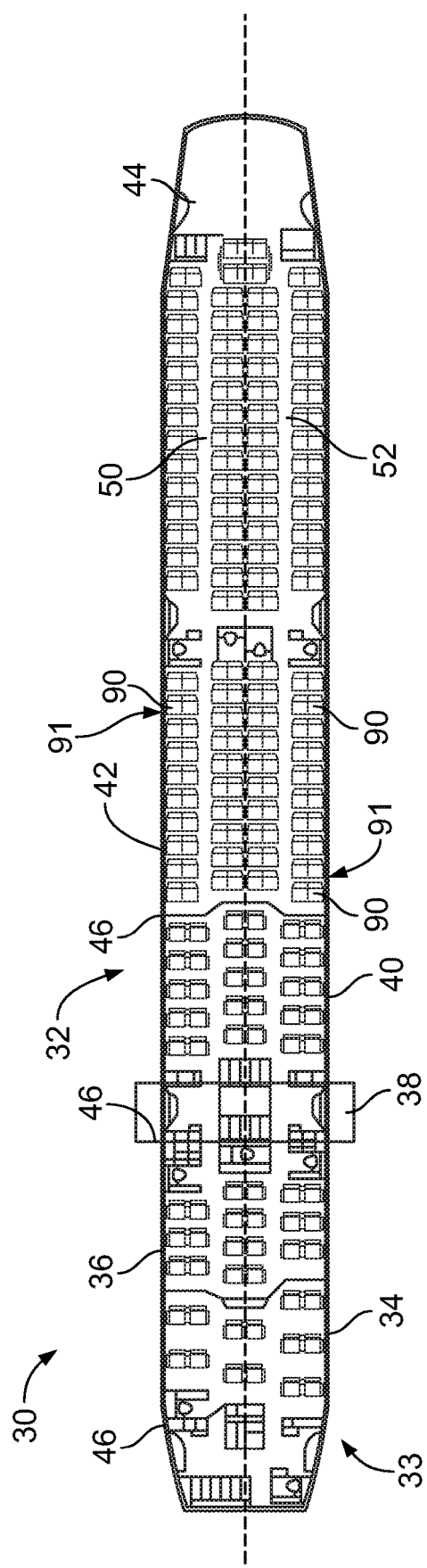
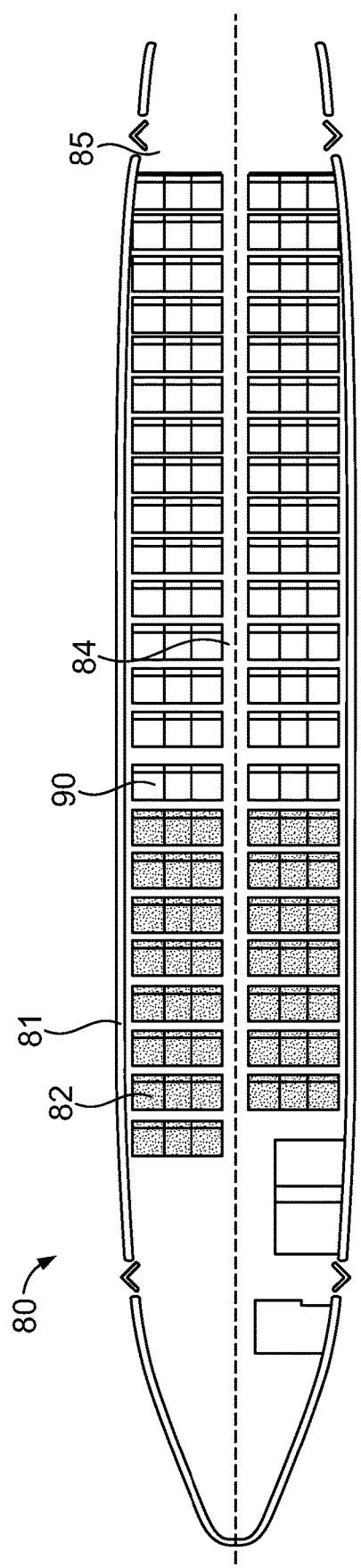
FIG. 2A
FIG. 2B

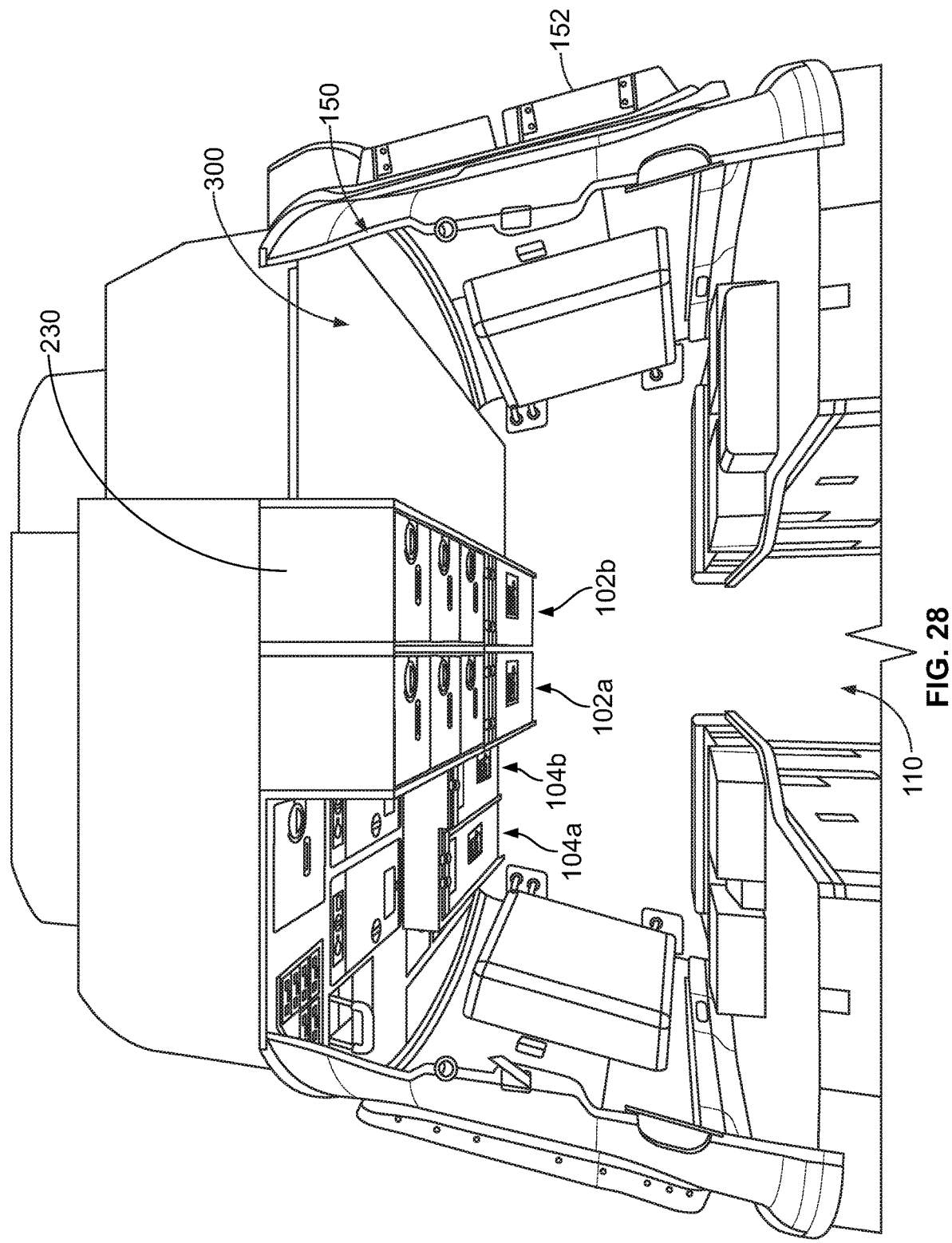

GALLEY SYSTEMS FOR AN INTERNAL CABIN OF A VEHICLE

FIELD OF EMBODIMENTS OF THE DISCLOSURE

Embodiments of the present disclosure generally relate to galley systems, and more particularly, to galley systems for an internal cabin of a vehicle, such as a commercial aircraft.

BACKGROUND OF THE DISCLOSURE

Commercial aircraft typically include an internal cabin that may be divided into numerous sections. A flight deck or cockpit is generally separated from a passenger cabin, which may include a first class section, a business class section, an economy section, and the like.

One or more galleys are also disposed within the internal cabin. For example, a galley may be located at the aft end of the internal cabin. The galleys are configured to facilitate passenger meal preparation and service, store beverages, food items, supplies, and the like. A typical galley includes galley carts (also referred to as trolleys) and waste carts that may be moved into and out of defined compartments. Flight attendants remove galley carts from the compartments and move the galley carts along an aisle in order to serve passengers within the internal cabin. Waste carts are also used frequently to increase the capacity of waste volume and facilitate waste collection throughout the cabin.

With increasing demand for various beverages and food items, there is a need for increased galley capacity. However, increasing galley space may encroach upon space that may otherwise be used for seats or other accommodations within the internal cabin. That is, a larger galley may take up space that may otherwise be used for passenger seating, flight attendant seating, or other cabin accommodations, such as closets and lavatories.

SUMMARY OF THE DISCLOSURE

A need exists for a galley that is able to accommodate an increased number of galley carts to support meal service levels as passenger densities are increasing on commercial aircraft. Further, a need exists for a galley that accommodates additional galley carts without taking up space that may otherwise be used for passenger or flight attendant seating within an internal cabin, increased seat pitch for improved passenger comfort, or other monuments such as lavatories, stowage, crew rest, and the like.

With those needs in mind, certain embodiments of the present disclosure provide a galley system within an internal cabin of an aircraft. The galley system includes one or more inboard cart compartments (such as inboard/lower galley cart compartments) that are configured to removably retain one or more first galley carts, and one or more first outboard cart compartments disposed to a first side of the inboard cart compartment(s) (such as inboard/center cart compartment(s)). The first outboard cart compartment(s) are configured to removably retain one or more second galley carts. The inboard cart compartment(s) extend forwardly in relation to the first outboard cart compartment(s).

In at least one embodiment, one or more second outboard cart compartments are disposed to a second side of the inboard cart compartment(s). The second outboard cart compartment(s) are configured to retain one or more third galley carts. The inboard cart compartment(s) extend forwardly in relation to the second outboard cart compartment(s).

The galley system may include two inboard cart compartments. The galley system may include two first and/or second outboard cart compartments.

In at least one embodiment, the inboard cart compartment(s) extend forwardly towards an aisle of the internal cabin.

In at least one embodiment, a non-linear egress path is formed in front of the galley system between aft doors (such as aft passenger egress/exit doors) of the aircraft. A central portion of the egress path extends forwardly into an aisle of the internal cabin. For example, the central portion of the egress path extends forwardly into the aisle in a non-linear fashion while still providing an unobstructed passageway of a regulated distance leading from the passenger areas to the aft exits.

In at least one embodiment, the inboard cart compartment(s) extend rearwardly in relation to the first outboard cart compartment(s). As an example, the inboard cart compartment(s) extend rearwardly towards a pressure bulkhead of the aircraft.

In at least one embodiment, a contoured scoop is coupled to (for example, secured to or integrally molded and formed with) a rear wall of the inboard cart compartment(s). As an example, the contoured scoop includes a forwardly-angled back panel that angles forwardly from a top edge extending from an upright portion of the rear wall, a lower canted panel connected to the forwardly-angled back panel, wherein the lower canted panel angles further forward from a lower edge of the forwardly-angled back panel, and a flat lower panel connected to the lower canted panel. The contoured scoop is forward of a clearance boundary of a pressure bulkhead of an airframe.

In at least one embodiment, the galley system is positioned within an aft section of the internal cabin.

The inboard cart compartment(s) may be coaxially aligned with a central longitudinal plane of the internal cabin. In at least one embodiment, the inboard cart compartment(s) are longer in both a fore direction and an aft direction than the first outboard cart compartment(s), and therefore can house additional galley carts compared to known galleys.

The inboard cart compartment(s) may include a shelf. An angled shelf wing may extend from the shelf to the first outboard cart compartment(s). In at least one embodiment, the inboard cart compartment(s) may include an extension that provides additional shelf space (for example, work surface, counter, or deck). The surface may be further increased with the additional of an angled shelf wing that takes full advantage of the available volume provided by the egress path(s).

A cabinet may extend upwardly from the inboard cart compartment(s). The cabinet extends forwardly along with the inboard cart compartment(s).

A monument may be disposed to a second side of the inboard cart compartment(s). The second side is opposite from the first side. As an example, the monument may include a lavatory including a toilet and a sink.

In at least one embodiment, galley structure above a galley work surface may extend forward towards an egress passageway in alignment with lower inboard cart compartments or extend upwardly from the inboard cart compartment(s). The storage structure above the compartment extends forwardly along with the inboard cart compartment(s). Additional volume provided by this structure may be utilized for additional stowage capacity, such as miscellaneous stowage compartments or standard container stowage, or may be utilized for electrical inserts, such as ovens, coffee makers, water boilers, and the like. This structure may also be a combination of increased work-counter area and a bump-out.

Certain embodiments of the present disclosure provide an aircraft including an internal cabin, and a galley system within the internal cabin, as described herein.

BRIEF DESCRIPTION OF THE DRAWINGS

FIG. 2A illustrates a top plan view of an internal cabin of an aircraft, according to an embodiment of the present disclosure.

FIG. 2B illustrates a top plan view of an internal cabin of an aircraft, according to an embodiment of the present disclosure.

FIG. 28 illustrates a perspective top view of the galley system of FIG. 26 within the aft section of the internal cabin of the aircraft.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a galley system that is configured to improve a passageway arrangement within an internal cabin of a vehicle, such as a commercial aircraft. The galley system is configured to accommodate an increased number of galley carts as compared to known galleys, work-surface area, and available above-counter galley insert capacity and/or volume, as compared to know galleys.

In at least one embodiment, the galley system includes one or more center or inboard cart compartments that are configured to removably retain one or more galley carts. The inboard cart compartments extend forwardly from lateral or outboard cart compartments. The inboard cart compartments extend forwardly into or otherwise toward an aisle and/or passageway of an internal cabin. In at least one embodiment, the forward extension of the inboard cart compartments forms a non-linear egress path between aft doors of a vehicle, such as a commercial aircraft. For example, a central portion of the egress path extends forwardly into and/or otherwise towards a central aisle, such as between attendant assist spaces or otherwise fixed objects within an internal cabin.

In at least one embodiment, a rear portion of the inboard cart compartments extend rearwardly towards a domed aft pressure bulkhead of the vehicle. A lower contoured scoop may be integrally formed with or secured to the rear portion of the inboard cart compartments. The lower contoured scoop is sized and shaped to allow galley carts to be positioned within the inboard cart compartments without the inboard cart compartments extending into a clearance area of the aft pressure bulkhead.

Certain embodiments of the present disclosure allow for increased galley capacity without structural changes to an airframe, or that require new certification methods.

Figure 1:
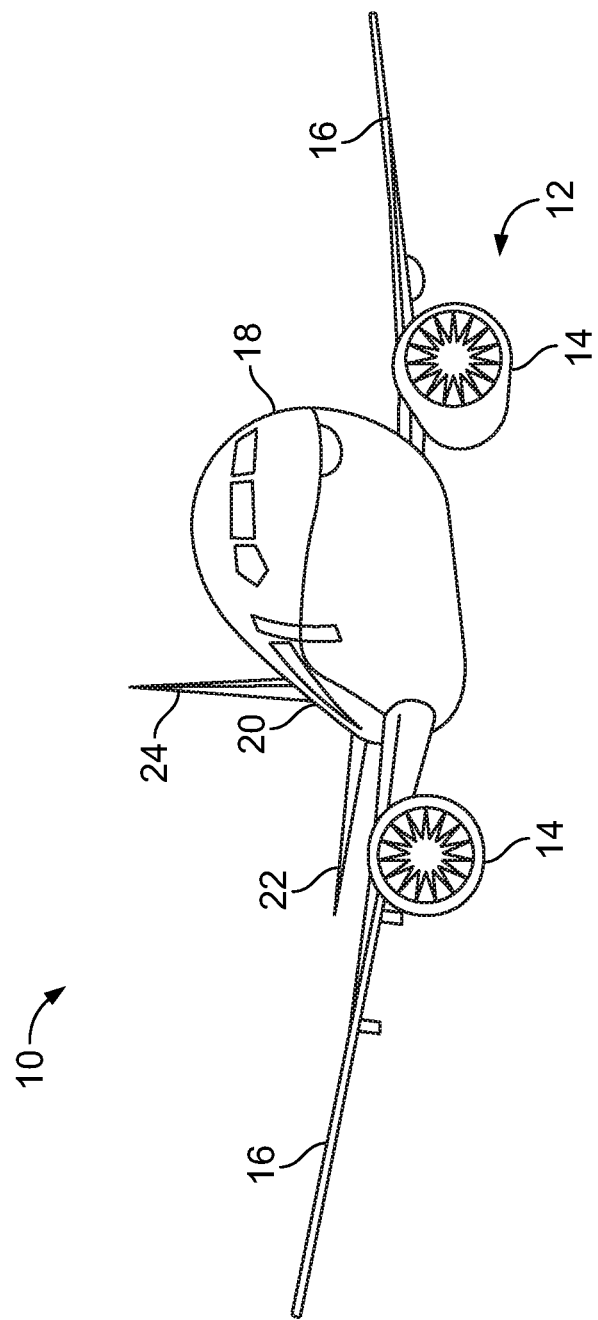
FIG. 1 illustrates a perspective front view of an aircraft, according to an embodiment of the present disclosure.

FIG. 1 illustrates a perspective top view of an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which galley system may be positioned.

Alternatively, instead of an aircraft, embodiments of the present disclosure may be used with various other vehicles, such as automobiles, buses, locomotives and train cars, seacraft, spacecraft, and the like.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46. In at least one embodiment, a galley system is located in the aft section 44.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 90 are positioned throughout the internal cabin 30. The seat assemblies 90 may be arranged in rows 91. The seat assemblies 90 are installed within the internal cabin 30. A plurality of seat assemblies 90 may be joined together (such as a set of three seat assemblies 90) to form a seat module.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having seat assemblies 90, and an aft section 85 behind the main cabin 82. In at least one embodiment, a galley system is located in the aft section 85. It is to be understood that the internal cabin 80 may include more or less sections than shown.

The internal cabin 80 may include a single (main) aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
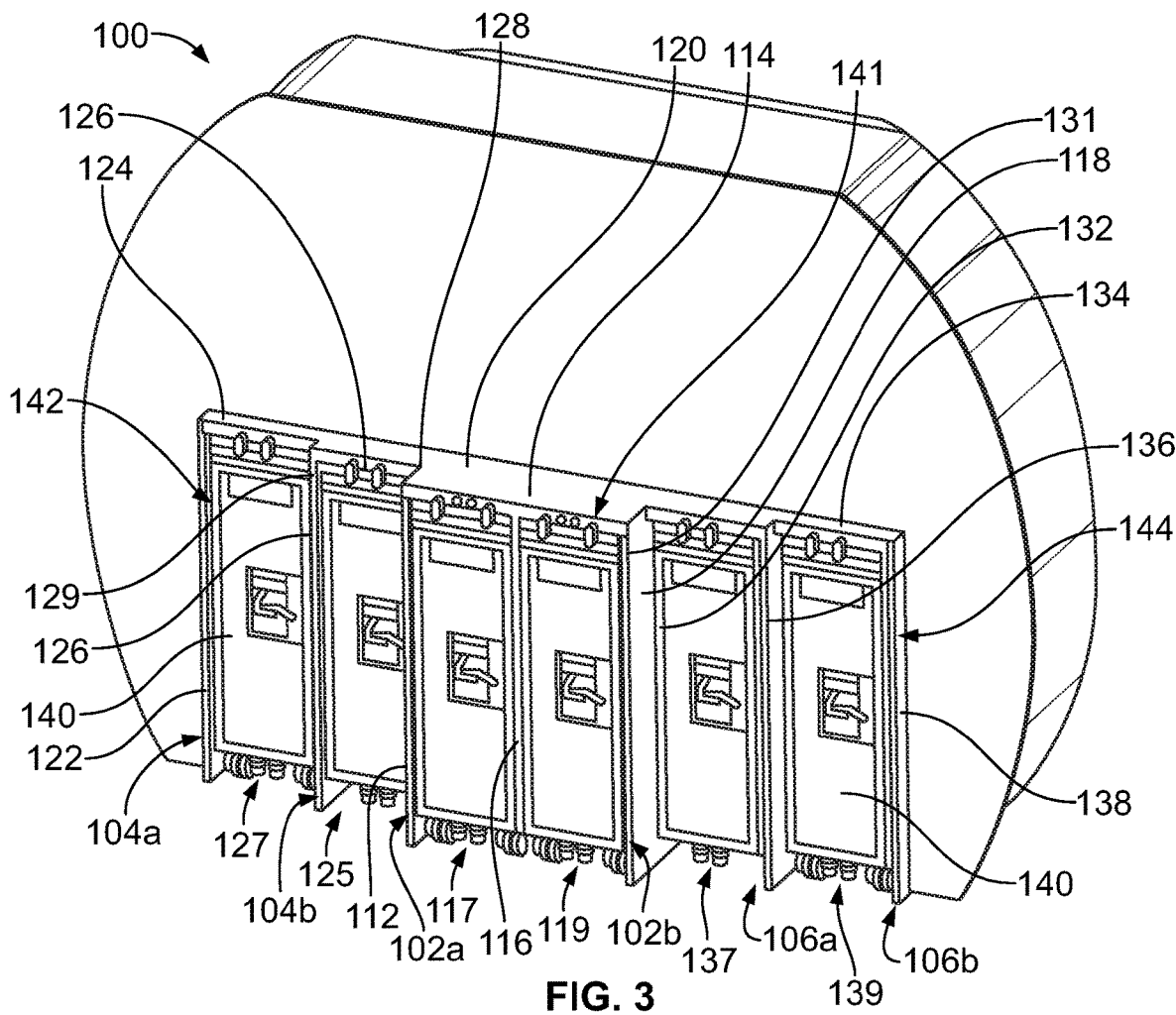
FIG. 3 illustrates a perspective front view of a galley system, according to an embodiment of the present disclosure.

FIG. 3 illustrates a perspective front view of a galley system 100, according to an embodiment of the present disclosure. The galley system 100 is configured to be disposed within an internal cabin of an aircraft, such as within the aft section 44 shown in FIG. 2A or the aft section 85 shown in FIG. 2B.

The galley system 100 includes central or inboard cart compartments 102a and 102b positioned inboard from first or right lateral or outboard cart compartments 104a and 104b and second or left lateral or outboard cart compartments 106a and 106b. As used herein, the term "outboard" means a position that is further away from a central longitudinal plane 108 of an internal cabin 110 (shown in FIG. 4) as compared to another component. The term "inboard" means a position that is closer to the central longitudinal plane 108 of the internal cabin 110 as compared to another component. For example, the inboard cart compartments 102a and 102b are closer to the central longitudinal plane 108 of the internal cabin 110 than the first outboard cart compartments 104a, 104b and the second outboard cart compartments 106a, 106b.

The inboard cart compartment 102a is defined by a first lateral wall 112 connected to an upper wall 114, thereby defining a cart chamber 117 therebetween. The inboard cart compartment 102b is defined by a second lateral wall 118, the upper wall 114, and the rear wall, thereby defining a cart chamber 119 therebetween. The cart chamber 117 and the cart chamber 119 may combine to form a single cart chamber. That is, the cart chamber 117 and the cart chamber 119 may not be separated by a central panel or wall. The upper wall 114 spans both the inboard compartment 102a and the inboard compartment 102b. Alternatively, a central divider wall 116 may be disposed between the inboard cart compartment 102a and the inboard cart compartment 102b. The central divider wall 116 is common to both the inboard cart compartment 102a and the inboard cart compartment 102b. In at least one embodiment, the galley system 100 may include just one inboard cart compartment 102a or 102b.

A top surface of the upper wall 114 provides a shelf 120, such as a galley work deck, work surface, or counter. The shelf 120 may be used by an attendant for various purposes, such as positioning items, preparing food or beverages, or the like.

The outboard cart compartment 104a is defined by a first lateral wall 122 connected to an upper wall 124, which, in turn connects to a central divider wall 126, and a rear wall (hidden from view in FIG. 3), thereby defining a cart chamber 127 therebetween. The outboard cart compartment 104b is defined by a second lateral wall 128 (such as a portion of the first lateral wall 112), the upper wall 124, the central divider wall 126, and the rear wall, thereby defining a cart chamber 125 therebetween. The upper wall 124 spans both the outboard compartment 104a and the outboard compartment 104b. The central divider wall 126 is common to both the outboard cart compartment 104a and the outboard cart compartment 104b. Optionally, there may not be a central divider wall 126 between the outboard cart compartment 104a and the outboard cart compartment 104b. In at least one embodiment, the galley system 100 may include just one outboard cart compartment 104a or 104b.

The outboard cart compartment 106a is defined by a first lateral wall 132 (such as a portion of the second lateral wall 118) connected to an upper wall 134, which, in turn connects to a central divider wall 136, and a rear wall (hidden from view in FIG. 3), thereby defining a cart chamber 137 therebetween. The outboard cart compartment 106b is defined by a second lateral wall 138, the upper wall 134, the central divider wall 136, and the rear wall, thereby defining a cart chamber 139 therebetween. The upper wall 134 spans both the outboard compartment 106a and the outboard compartment 106b. The central divider wall 136 is common to both the outboard cart compartment 106a and the outboard cart compartment 106b. Optionally, there may not be a central divider wall 136 between the outboard cart compartment 106a and the outboard cart compartment 106b. In at least one embodiment, the galley system 100 may include just one outboard cart compartment 106a or 106b.

Each of the inboard cart compartments 102a, 102b, the first outboard cart compartments 104a, 104b, and the second outboard cart compartments 106a, 106b is configured to retain one or more galley carts 140. The galley carts 140 are configured to be selectively retained within, and removed from, the inboard cart compartments 102, 102b, the first outboard cart compartments 104a, 104b, and the second outboard cart compartments 106a, 106b.

As shown in FIG. 3, the inboard cart compartments 102a,102b are between the outboard cart compartments 104a, 104b, and the outboard cart compartments 106a, 106b. The outboard cart compartments 104a, 104b are disposed to a first side 129 of the inboard cart compartments 102a, 102b, and the outboard cart compartments 106a, 106b are disposed to a second side 131 (opposite from the first side 129) of the inboard cart compartments 102a, 102b. The inboard cart compartments 102a, 102b extend forwardly in relation to (for example, further forward as compared to) the first outboard cart compartments 104a, 104b and the second outboard cart compartments 106a, 106b. For example, front faces 141 of the inboard cart compartments 102 and 102b, such as defined by front edges of the first lateral wall 112, the upper wall 114, and the second lateral wall 118 extend further forward than front faces 142 of the first outboard compartments 104a, 104b, and front faces 144 of the second outboard compartments 106a, 106b.

Figure 4:
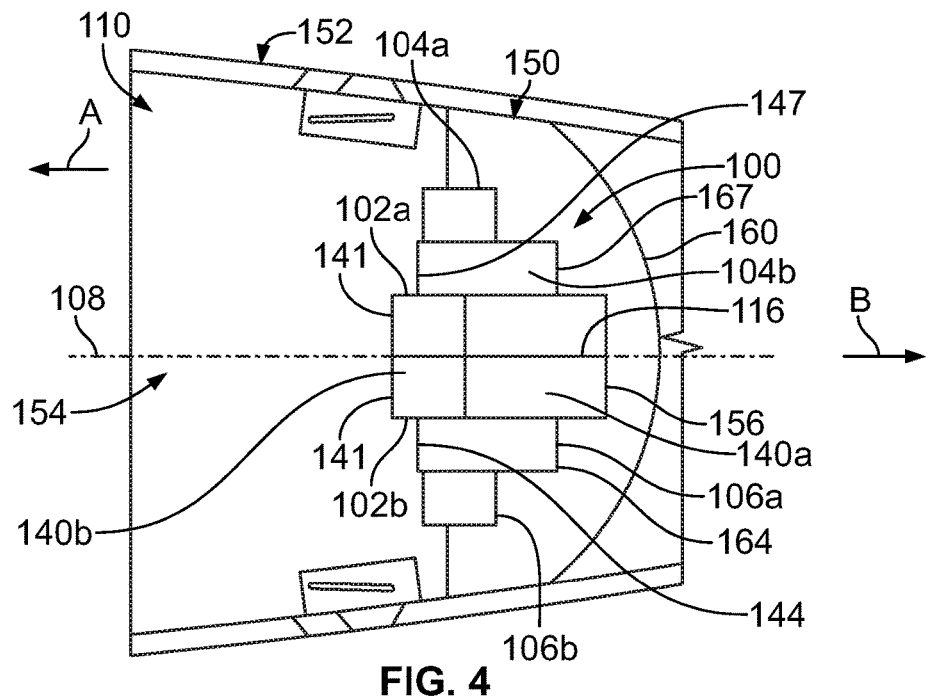
FIG. 4 illustrates a top schematic view of the galley system within an aft section of an internal cabin of an aircraft, according to an embodiment of the present disclosure.
Figure 5:
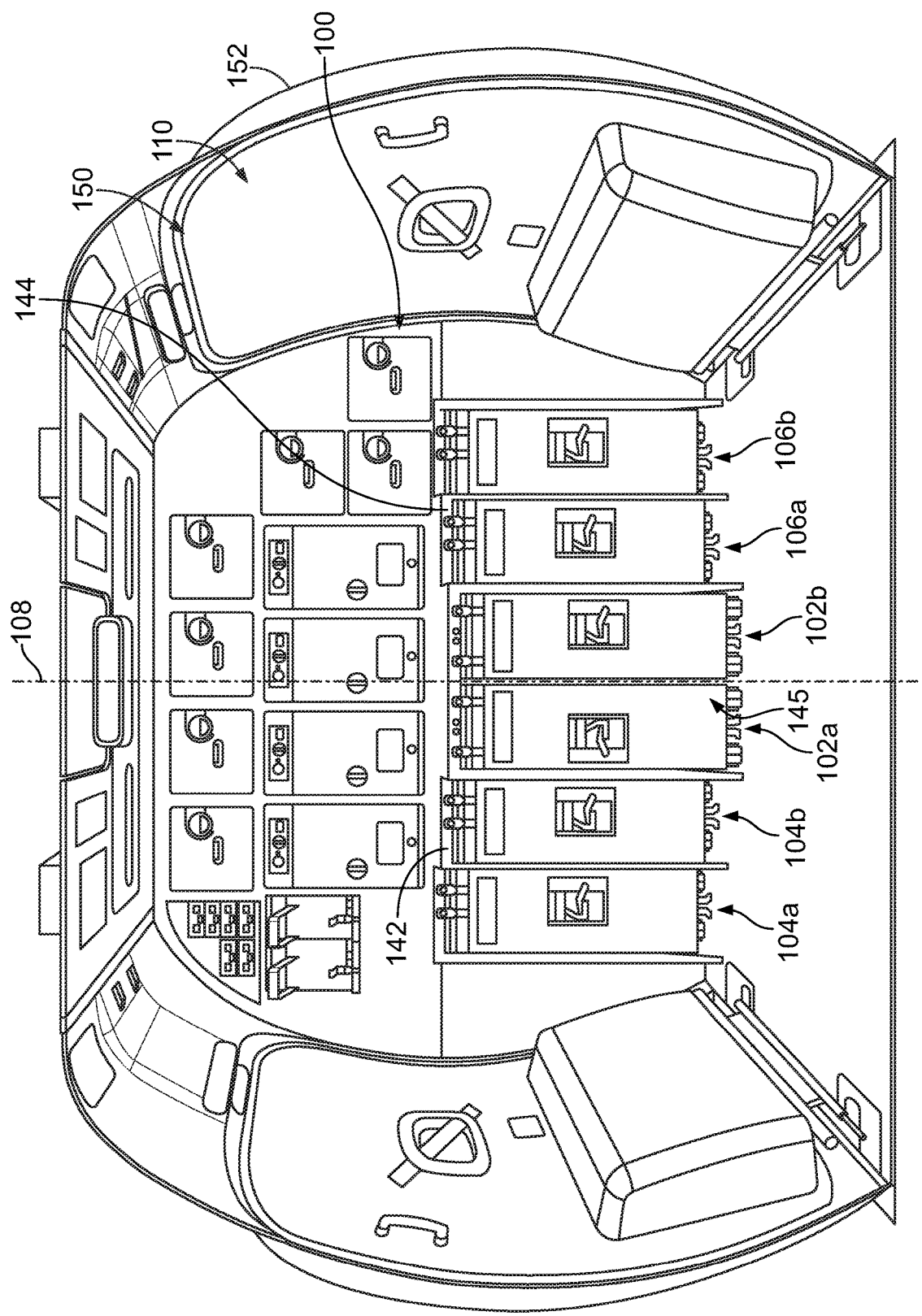
FIG. 5 illustrates a perspective front view of the galley system of FIG. 4 within the aft section of the internal cabin of the aircraft.
Figure 6:
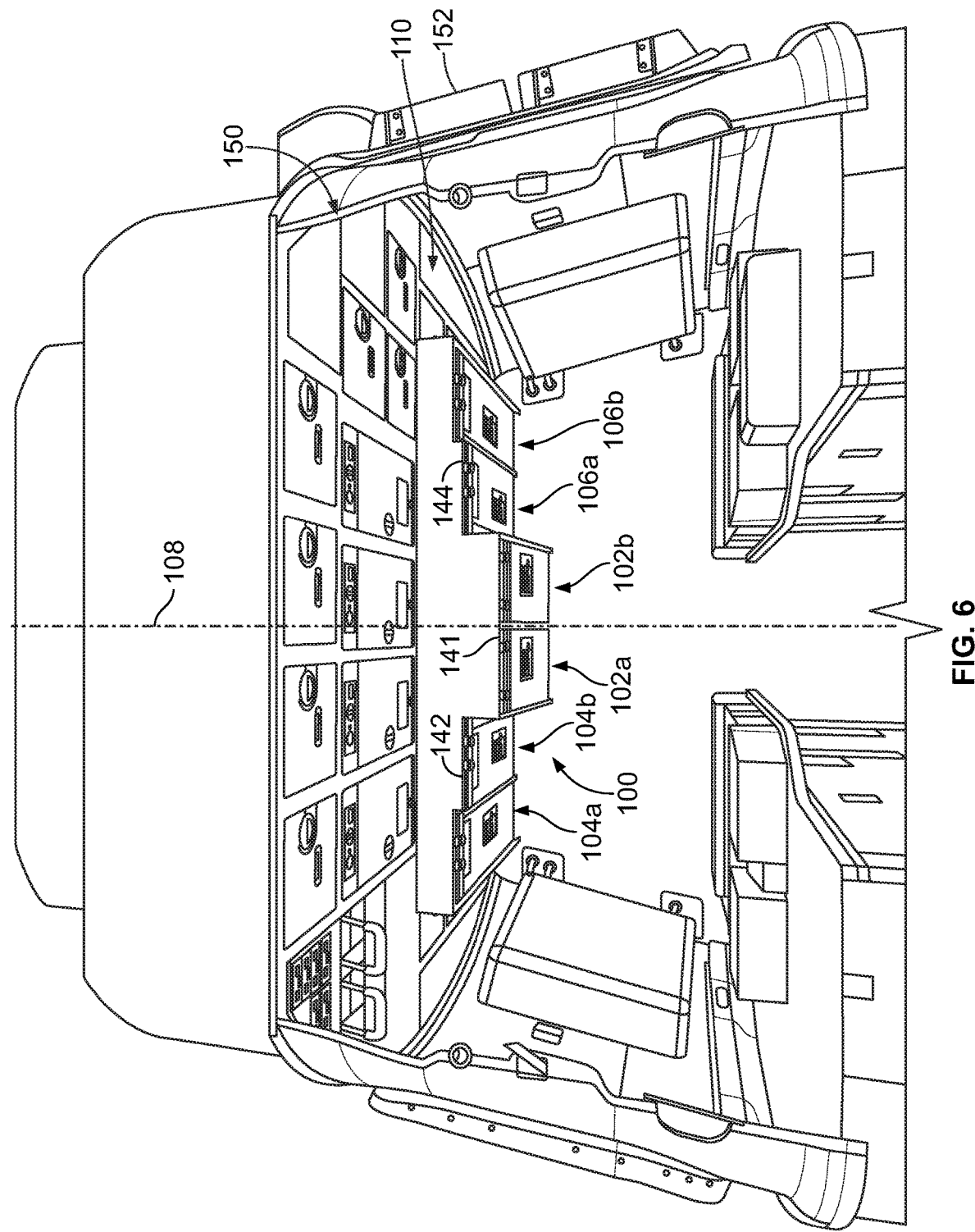
FIG. 6 illustrates a perspective top view of the galley system of FIG. 4 within the aft section of the internal cabin of the aircraft.

FIG. 4 illustrates a top schematic view of the galley system 100 within an aft section 150 of the internal cabin 110 of an aircraft 152, according to an embodiment of the present disclosure. FIG. 5 illustrates a perspective front view of the galley system 100 of FIG. 4 within the aft section 150 of the internal cabin 110 of the aircraft 152. FIG. 6 illustrates a perspective top view of the galley system 100 of FIG. 4 within the aft section 150 of the internal cabin 110 of the aircraft 152. Referring to FIGS. 4-6, the front faces 141 of the inboard cart compartments 102a and 102b extend further forward towards (although not necessary into) an aisle 154, into a passageway, than the front faces 142 of the first outboard cart compartments 104a and 104b and the front faces 144 of second outboard cart compartments 106a and 106b.

In at least one embodiment, the outboard cart compartment 104b may be further forward than the outboard cart compartment 104a, and the outboard cart compartment 106a may be further forward than the outboard cart compartment 106b. Optionally, the front faces 142 of the outboard cart compartments 104a and 104b may be at the same forward distance, and the front faces 144 of the outboard cart compartments 106a and 106b may be at the same forward distance.

In at least one embodiment, the inboard cart compartments 102a and 102b may be symmetrical about the central longitudinal plane 108. For example, the central divider wall 116 or central plane (when no central divider wall 116 is present) dividing the inboard cart compartments 102a and 102b may be coaxially aligned with the central longitudinal plane 108. In at least one embodiment, the galley system 100, including the inboard cart compartments 102a, 102b, the first outboard cart compartments 104a, 104b, and the second outboard cart compartments 106a, 106b may be symmetrical about the central longitudinal plane 108.

As show in FIG. 4, the rear wall 156 that forms rear portions of the inboard cart compartments 102a and 102b extends further rearwardly towards a pressure bulkhead 160 (such as a domed bulkhead) than a rear wall 162 of the first outboard cart compartments 104a, 104b, and a rear wall 164 of the second outboard cart compartments 106a, 106b. As such, the inboard cart compartments 102a, 102b are longer in both the fore direction A and the aft direction B than the first outboard cart compartments 104a, 104b, and the second outboard cart compartments 106a, 106b.

In at least one embodiment, the outboard cart compartment 104b may be further rearward than the outboard cart compartment 104a, and the outboard cart compartment 106a may be further rearward than the outboard cart compartment 106b. Optionally, the rear walls 162 of the outboard cart compartments 104a and 104b may be at the same rearward distance, and the rear walls 164 of the outboard cart compartments 106a and 106b may be at the same rearward distance.

Each of the inboard cart compartments 102a, 102b is configured to retain a full-size galley cart 140a and a half-size galley cart 104b (shown in FIG. 4, in particular), or optionally three half-size galley carts or two two-thirds-size galley carts. At least one of the first and second outboard cart compartments 104a, 104b, 106a, and 106b is configured to retain a full galley cart 140a, or two half-size galley carts. As shown, at least one of the first outboard cart compartments 104a, 104b may be smaller than the other. Similarly, at least one of the second outboard cart compartments 106a, 106 may be smaller than the other. Optionally, the first outboard cart compartments 104a, 104b may be the same size, and the second outboard compartments 106a, 106b may be the same size.

In at least one embodiment, the outboard compartments may be combined with a dual center compartment. The outboard compartment may accommodate one half-size or third-size cart each.

Figure 7:
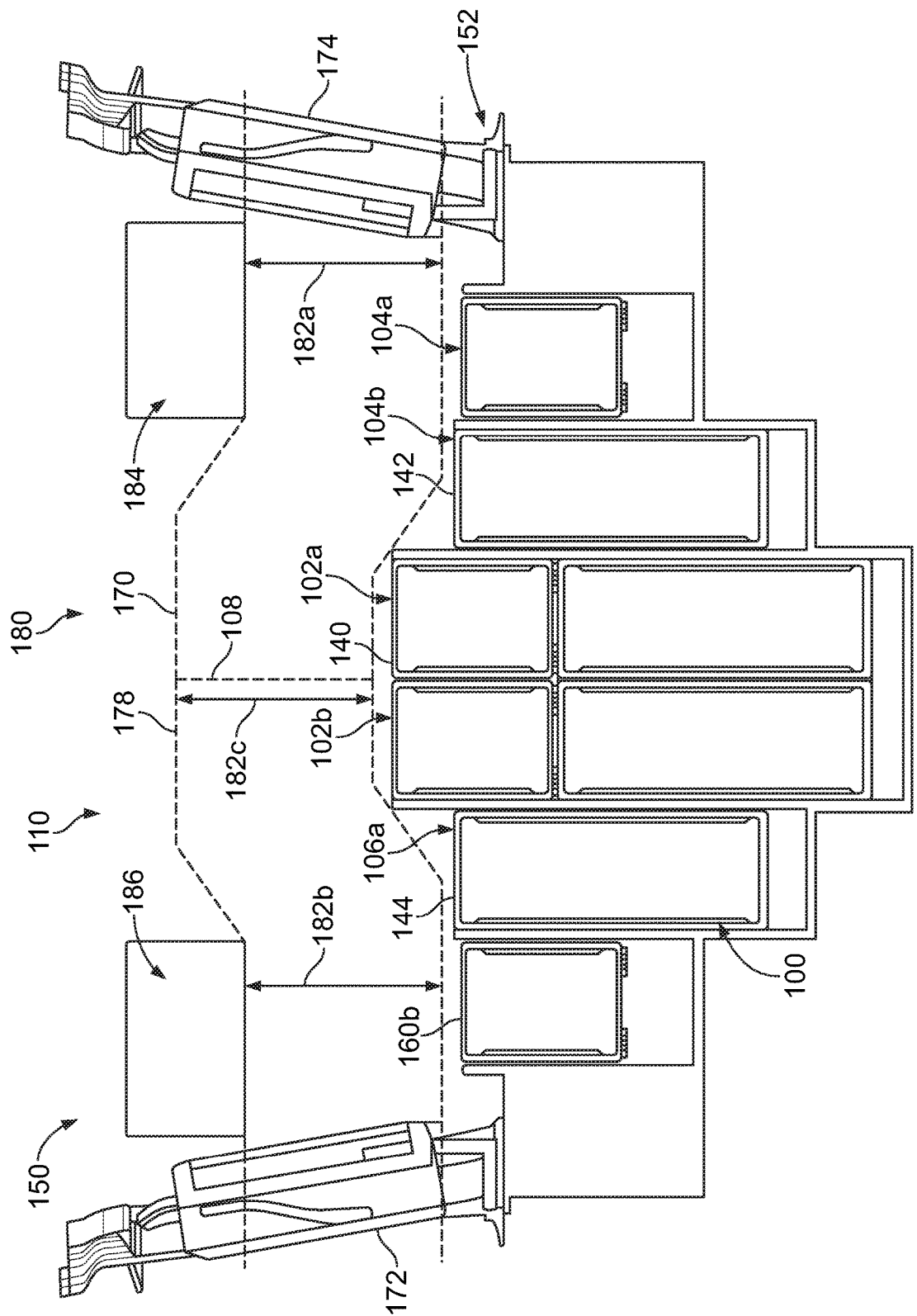
FIG. 7 illustrates a top view of an egress path within the aft section of the internal cabin of the aircraft.

FIG. 7 illustrates a top view of an egress path 170 (for example, an egress passageway) within the aft section 150 of the internal cabin 110 of the aircraft 152. The egress path 170 extends between a first aft door 172 and a second aft door 174 on opposite sides of the aft section 150.

The forward extension of the inboard cart compartments 102a and 102b forms egress path 170, which is non-linear, between the aft doors 172 and 174. For example, a central portion 178 of the egress path 170 extends forwardly towards (but not necessarily into) an aisle 180 of the internal cabin 110. The forward extension towards the aisle 180 forms a non-linear egress passageway (for example, a joggle between areas that may not be impeded upon, such as by assist spaces, monuments, seats, or other fixed cabin structure). The aisle 180 is generally perpendicular to the central portion 178.

The egress path 170 is regulated to be a certain width 182 between the aft doors 172 and 174. For example, the egress path 170 may be a minimum of 20 inches over an entire distance between the aft doors 172 and 174. The forwardly-extending front faces 141 of the inboard cart compartments 102a and 102b forwardly-shifts the egress path 170 in a forward direction in relation to the aft doors 172 and 174. As such, a straight, linear path is not formed between the aft doors 172 and 174. The egress path 170, forwardly-shifted by the front faces 141 of the inboard cart compartments 102a and 102b, maintains a required, regulated width 182 over an entire length between the aft doors 172 and 174. For example, the width 182a of the egress path 170 between a first assist space 184 and the first outboard compartments 104a, 104b is at least the same as the width 182b of the egress path 170 between a second assist space 186 and the second outboard compartments 106a, 106b, and the width 182c in front of the inboard cart compartments 102a, 102b is equal to or greater than either of the widths 182a or 182b as the aisle 180 is in front of the inboard cart compartments 102a, 102b.

The shifted, non-linear shape of the egress path 170 allows the inboard cart compartments 102a and 102b to extend further forwardly. As such, the inboard cart compartments 102a and 102b may be larger and accommodate additional galley carts (such as additional half size carts) without running afoul of regulations regarding the width of the egress path 170.

Figure 8:
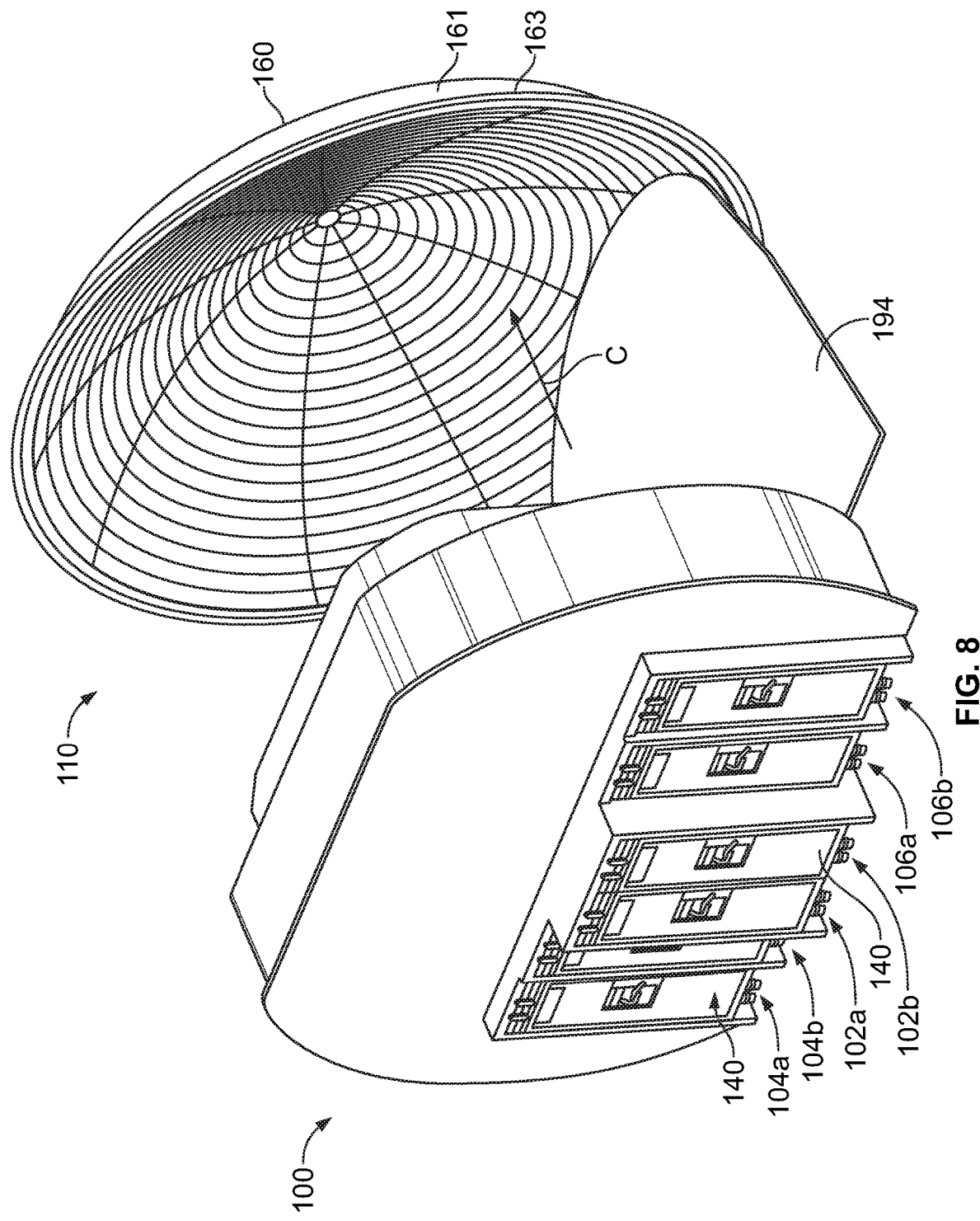
FIG. 8 illustrates a perspective front view of the galley system in relation towards a pressure bulkhead, according to an embodiment of the present disclosure.

FIG. 8 illustrates a perspective front view of the galley system 100 in relation to the pressure bulkhead 160 within the internal cabin 110, according to an embodiment of the present disclosure. The galley system 100 may be a galley module that is urged towards the pressure bulkhead 160 in the direction of arrow C, and supported on a floor 194 or other such structure of the aircraft. The galley system 100 may be secured within the internal cabin 110 through tie rods that attach to a fuselage/airframe, hard point attachments and stabilizer fittings to the floor 194, fittings, fasteners, and/or the like. The pressure bulkhead 160 includes a dome-shaped body 161 that rearwardly extends from a rim 163. Alternatively, the body 161 may be shaped other than a dome.

Figure 9:
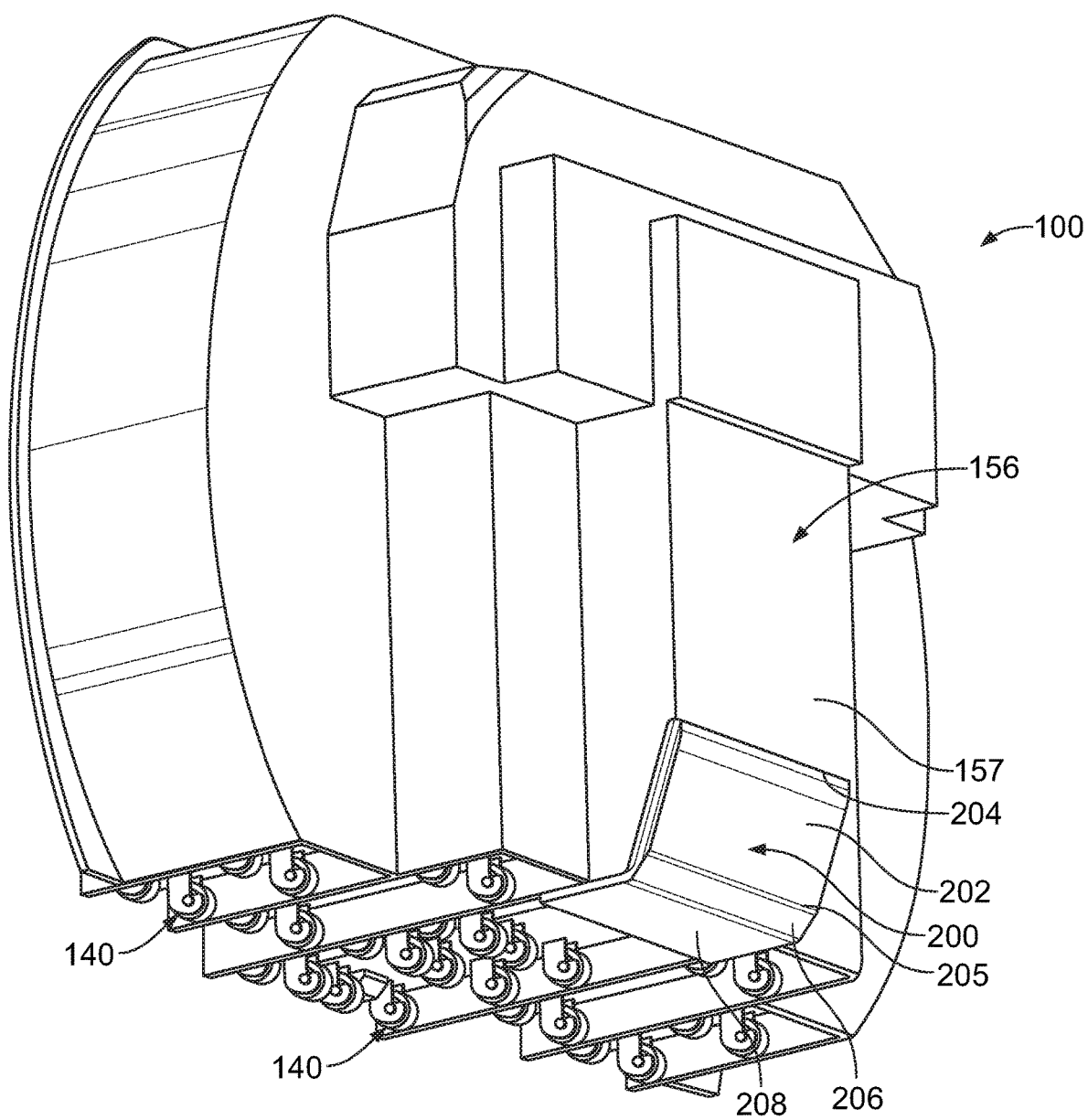
FIG. 9 illustrates a perspective rear view of the galley system, according to an embodiment of the present disclosure.

FIG. 9 illustrates a perspective rear view of the galley system 100, according to an embodiment of the present disclosure. A contoured scoop 200 forms part of, or is secured to, a lower portion of the rear wall 156, which defines rear surfaces of the inboard compartments 102a and 102b (shown in FIG. 8, for example). In at least one embodiment, the contoured scoop 200 may be an integrally formed portion of the rear wall 156. For example, the contoured scoop 200 may form a lower, contoured portion of the rear wall 156. As another example, the contoured scoop 200 may be a separate and distinct structure, such as a pan or panel, that is secured to the rear wall 156.

The contoured scoop 200 includes a forwardly-angled back panel 202 that angles forwardly from a top edge 204 extending from an upright (for example, vertical) portion 157 of the rear wall 156 to a lower canted panel 206 (connected to the forwardly-angled back panel 202). The lower canted panel 206 angles further forward from a lower edge 205 of the back panel 202. The lower canted panel 206, in turn, connects to a flat lower panel 208, which may be perpendicular to the upright (for example, vertical) portion 157 of the rear wall 156.

Figure 10A:
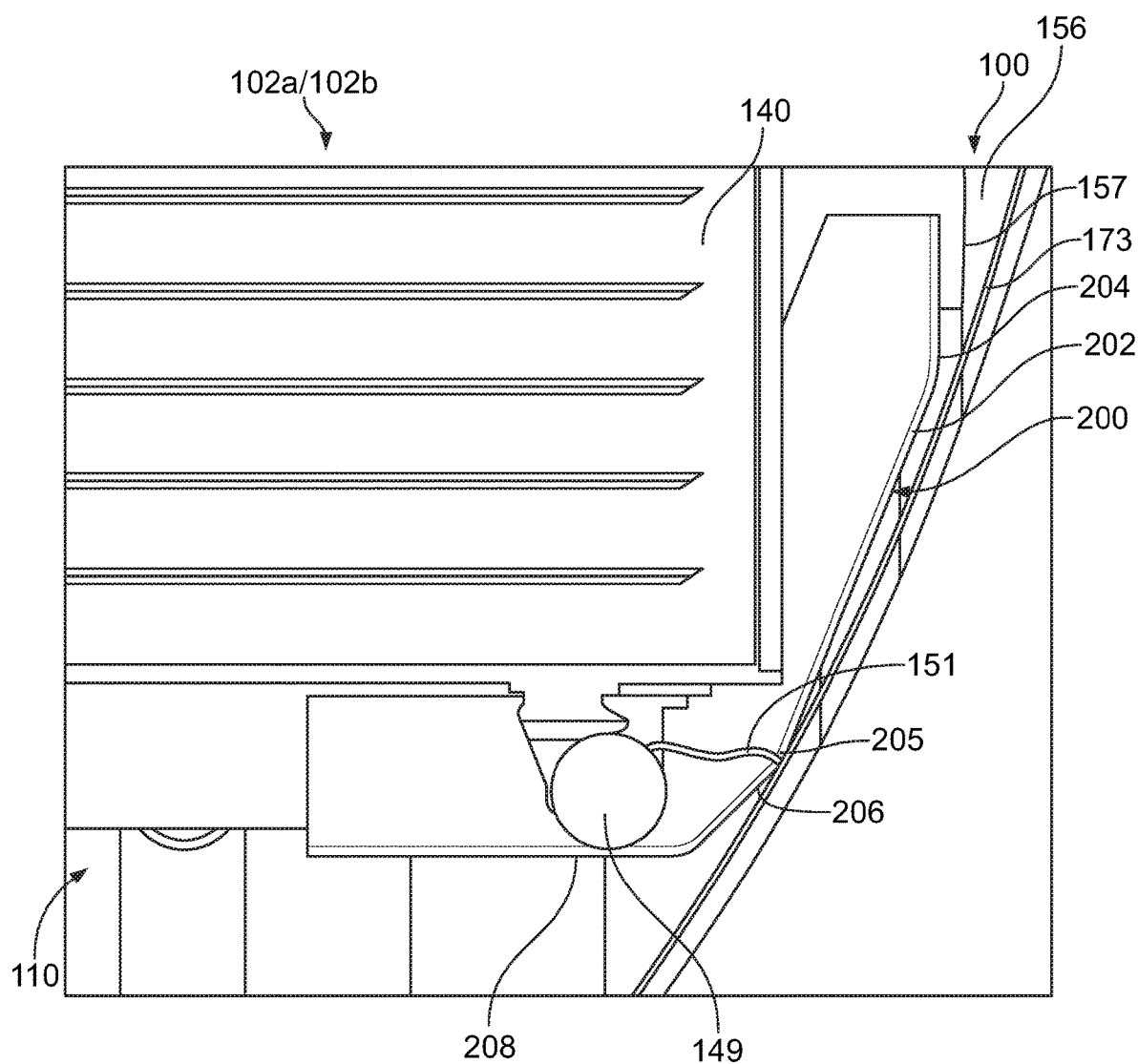
FIG. 10A illustrates a transverse cross-sectional view of a contoured scoop of the galley system, according to an embodiment of the present disclosure.

FIG. 10A illustrates a transverse cross-sectional view of the contoured scoop 200 of the galley system 100, according to an embodiment of the present disclosure. As shown, the flat lower panel 208 (for example, horizontal or otherwise parallel to a floor of the internal cabin 110) is configured to support a rear caster 149 of a galley cart 140 in a fully rearward position within an inboard cart compartment 102a or 102b. The forwardly-contoured shape of the contoured scoop 200 allows for the rear caster 149 to be supported on the flat lower panel 208, while the forwardly-angled back panel 202 and the lower canted panel 206 provide sufficient space for a fully-extended brake 151 coupled to the rear caster 149.

Further, the rear profile of the contoured scoop 200, such as defined by outer surfaces of the forwardly-angled back panel 202 and the lower canted panel 206, is forwardly disposed from a clearance boundary 173 of the pressure bulkhead 160 (shown in FIG. 8). The clearance boundary 173 is an arcuate boundary in front of interior surfaces of the dome-shaped body 161 (shown in FIG. 8) into which the certain components may not extend.

The contoured scoop 200 allows the inboard cart compartments 102a and 102b to extend rearwardly further towards the pressure bulkhead 160, as compared to if the rear wall 156 abutted, via a galley seal, the floor 194 (shown in FIG. 8) at a right angle. The contoured scoop 200 provides adequate clearance for the galley system 100 in relation to the pressure bulkhead 160, which allows galley carts to extend further aft within the internal cabin 110. The contoured scoop 200 allows for larger inboard cart compartments 102a and 102b, which thereby allows for additional cart space, which accommodates at least one additional galley cart, as compared to known galleys.

Figure 10B:
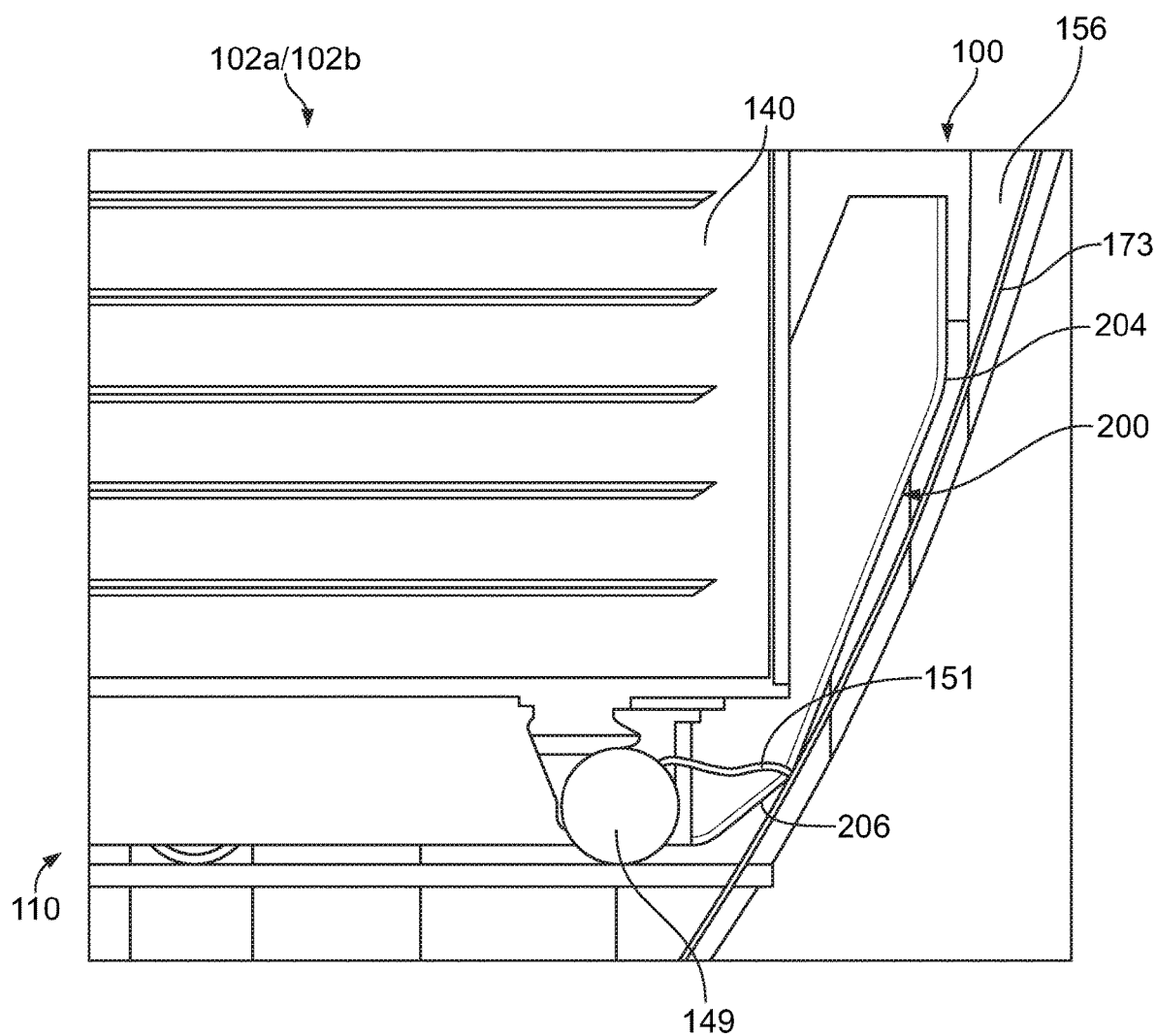
FIG. 10B illustrates a transverse cross-sectional view of a contoured scoop of the galley system, according to an embodiment of the present disclosure.

FIG. 10B illustrates a transverse cross-sectional view of the contoured scoop 200 of the galley system 100, according to an embodiment of the present disclosure. In this embodiment, the contoured scoop 200 does not include the flat lower panel 208 (shown in FIG. 10A). Instead, rear casters 149 may be supported directly on a floor of the internal cabin.

Figure 11:
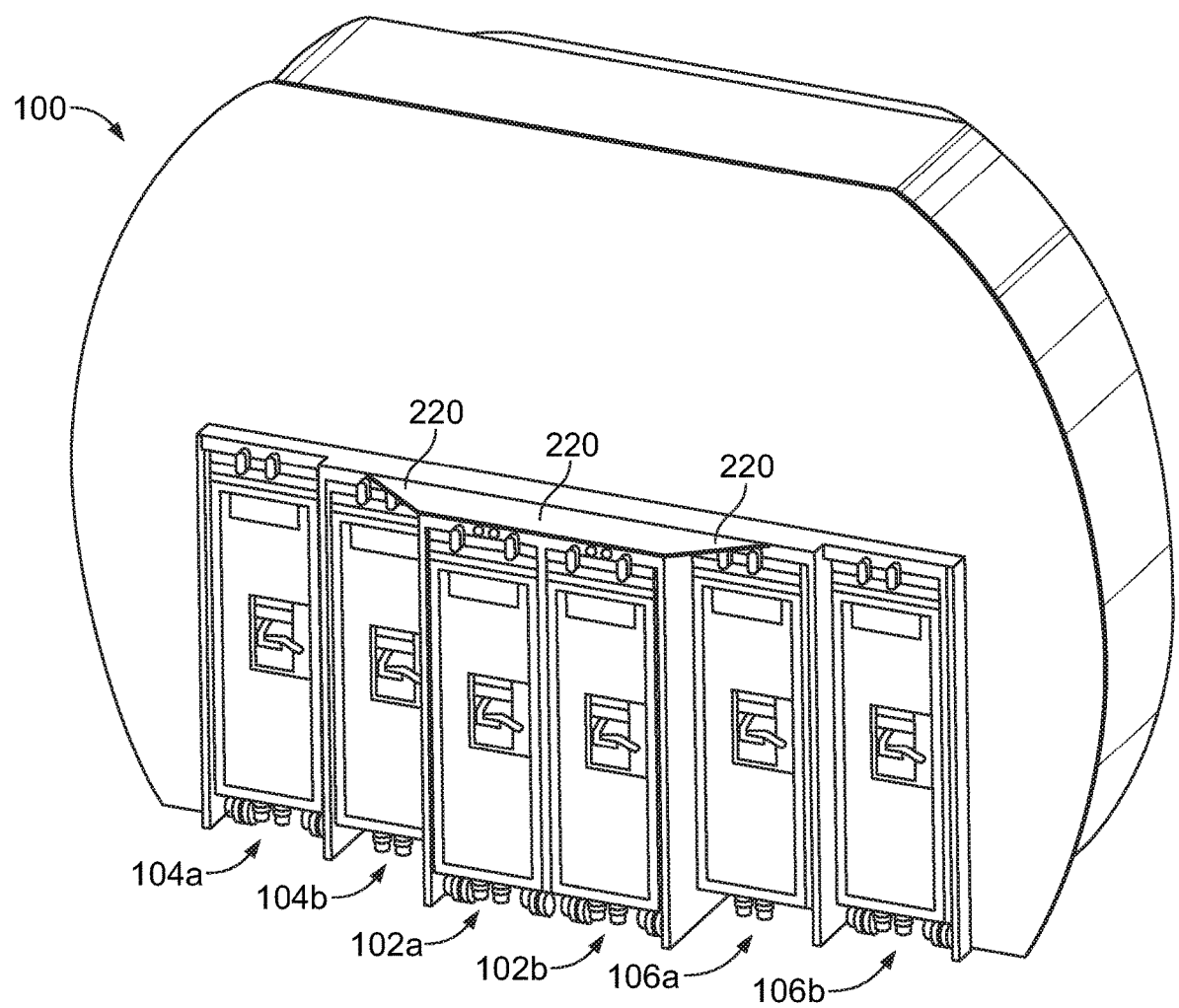
FIG. 11 illustrates a perspective front view of a galley system, according to an embodiment of the present disclosure.

FIG. 11 illustrates a perspective front view of a galley system 100, according to an embodiment of the present disclosure. In this embodiment, angled shelf wings 220 lateral extend the shelf 120 and connect to upper portions of the outboard cart compartment 104b and the outboard cart compartment 106a, thereby providing increased work surface. Referring to FIGS. 7 and 11, the shelf wings 220 do not extend into the egress path 170.

Figure 12:
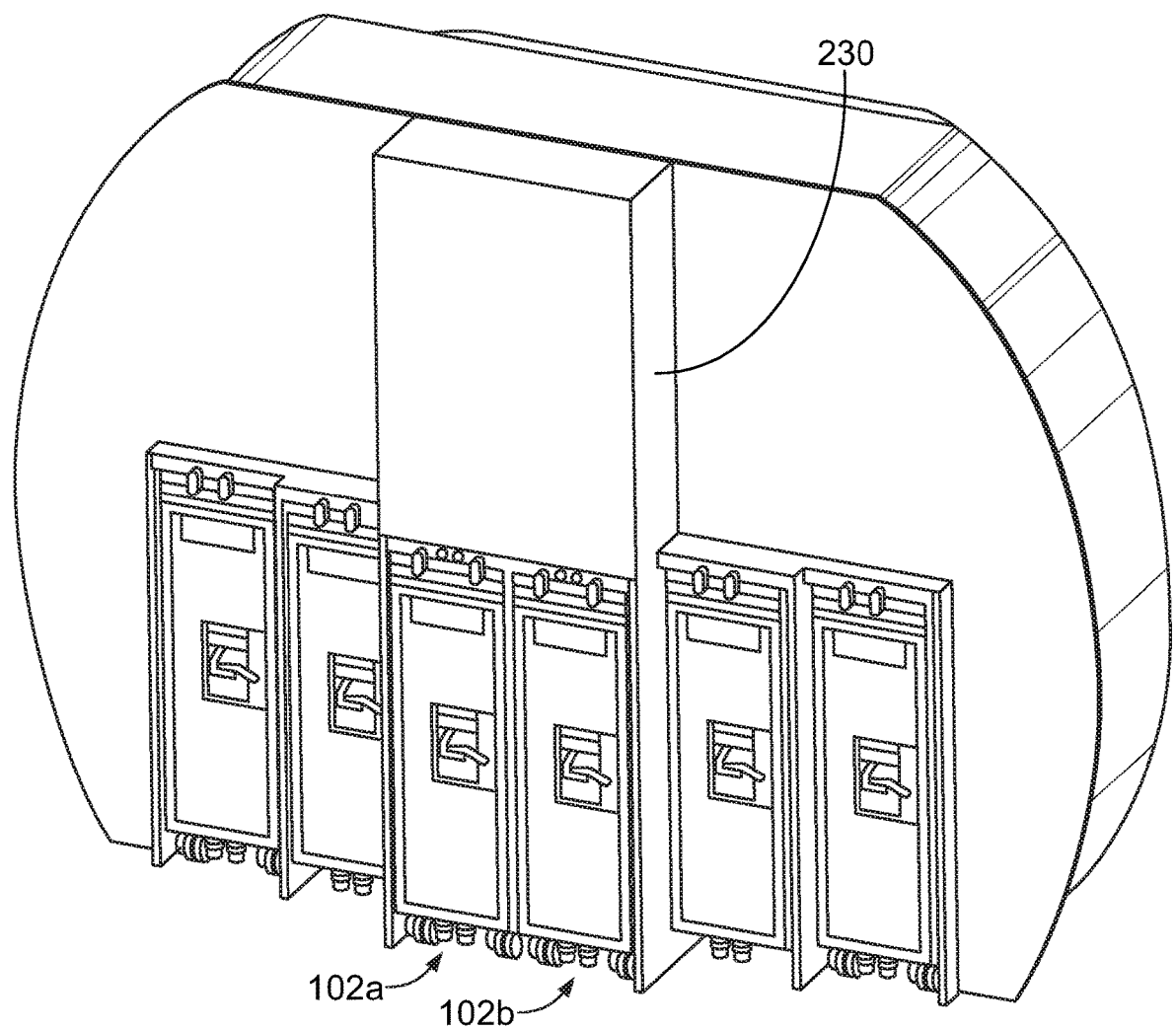
FIG. 12 illustrates a perspective front view of a galley system, according to an embodiment of the present disclosure.
Figure 13:
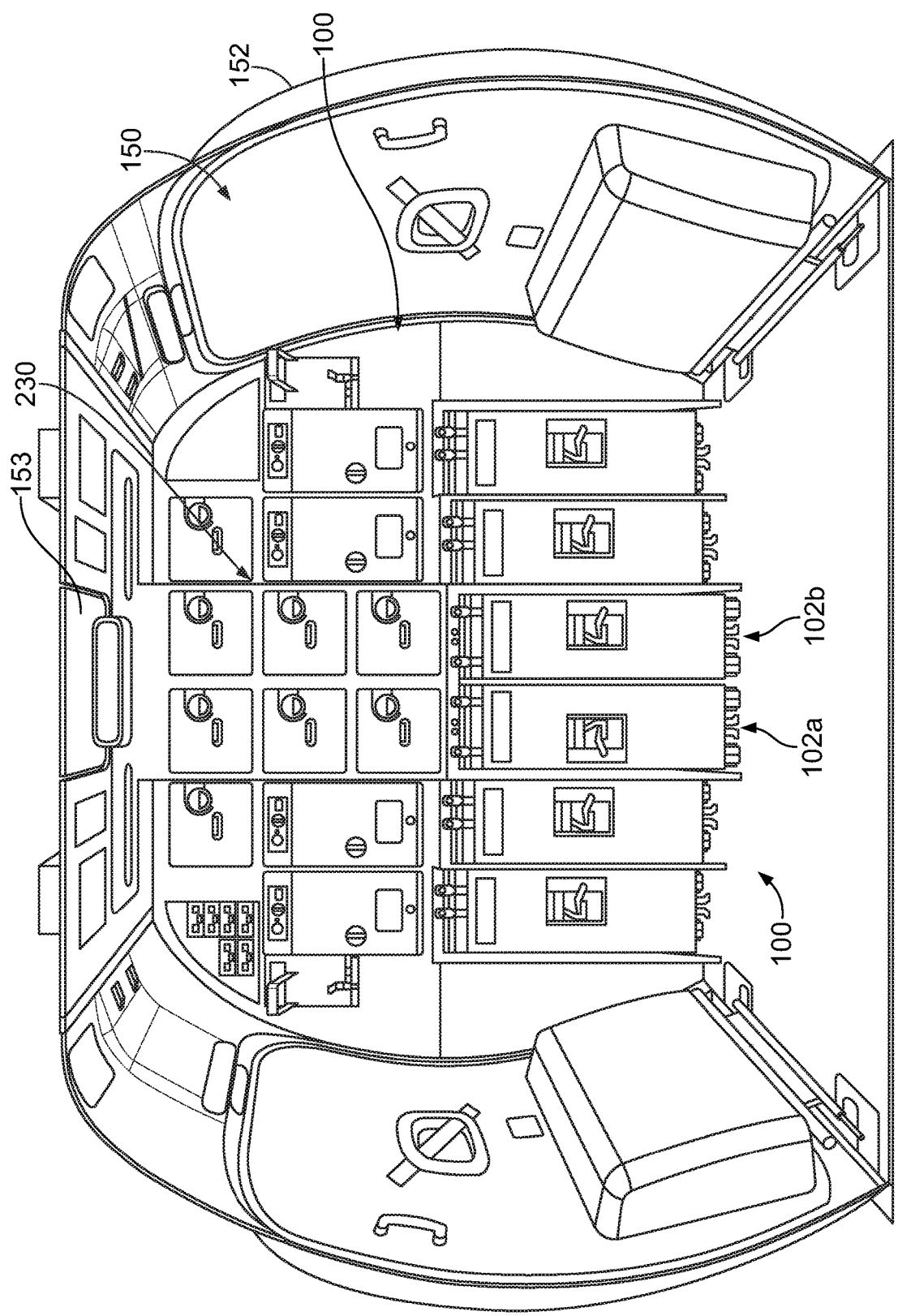
FIG. 13 illustrates a perspective front view of the galley system of FIG. 12 within the aft section of the internal cabin of the aircraft.
Figure 14:
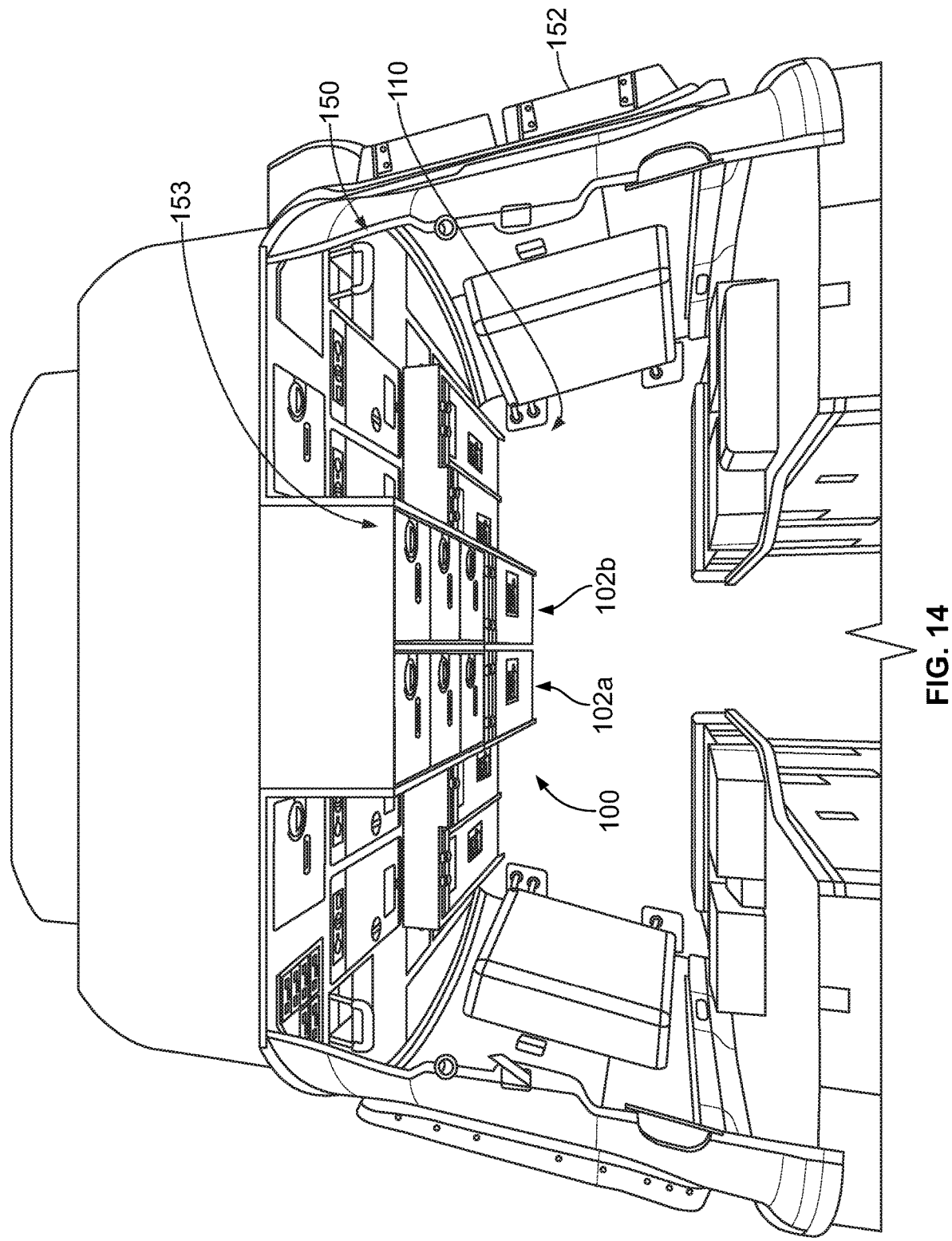
FIG. 14 illustrates a perspective top view of the galley system of FIG. 12 within the aft section of the internal cabin of the aircraft.

FIG. 12 illustrates a perspective front view of a galley system 100, according to an embodiment of the present disclosure. FIG. 13 illustrates a perspective front view of the galley system 100 of FIG. 12 within the aft section 150 of the internal cabin 110 of the aircraft 152. FIG. 14 illustrates a perspective top view of the galley system 100 of FIG. 12 within the aft section 150 of the internal cabin 110 of the aircraft 152.

Referring to FIGS. 12-14, a cabinet 230 (for example, a configurable galley cabinet) extends upwardly from the inboard cart compartments 102a and 102b towards an egress path in alignment with the lower inboard compartments. The cabinet 230 may extend to any height between the inboard compartments 102 and 102b and a ceiling 153 of the internal cabin 110. The cabinet 230 may increase the available capacity to contain or otherwise retain various electrical and non-electrical galley inserts, waste containers, chambers, and/or the like. The cabinet 230 may extend forwardly along with the inboard cart compartments 102a and 102b. For example, the cabinet 230 may extend forwardly the same distance as the inboard cart compartments 102a and 102b. Further, such an extension of the galley structure enables up to four sets of triple-deep standard container stowage, more specifically a galley stowage compartment that allows for back-to-back-to-back standard container stowage within a single chamber. Such an arrangement is enabled by the embodiment of the present enclosure of extending the cabinet 230 above the galley work deck forward in alignment with lower compartments 102a and 102b. A cabinet, such as the cabinet 230, may be used with any of the embodiments of the present disclosure in place of a shelf (for example, extended work surface) over the inboard cart compartments 102a and 102b.

Figure 15:
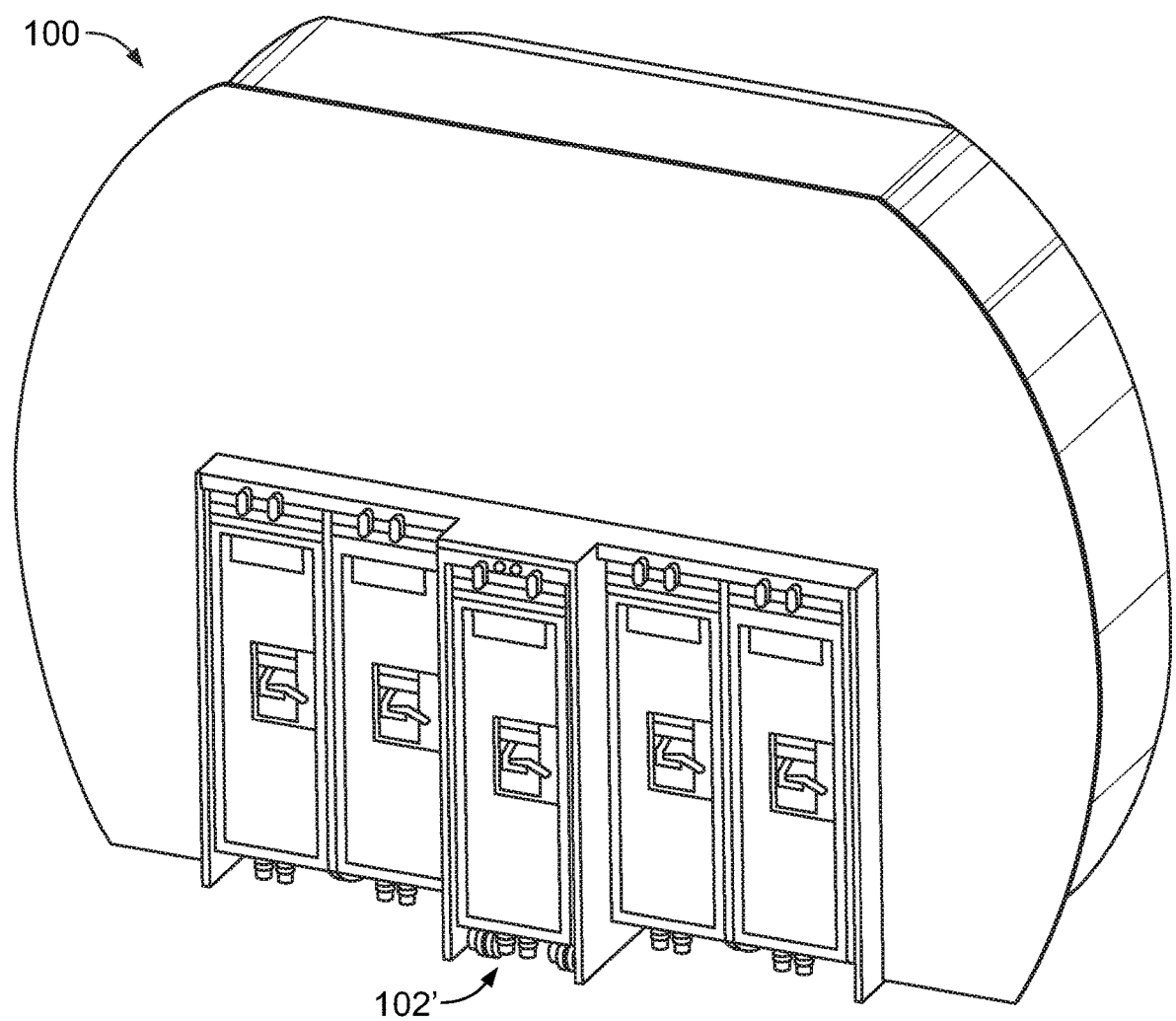
FIG. 15 illustrates a perspective front view of a galley system, according to an embodiment of the present disclosure.
Figure 16:
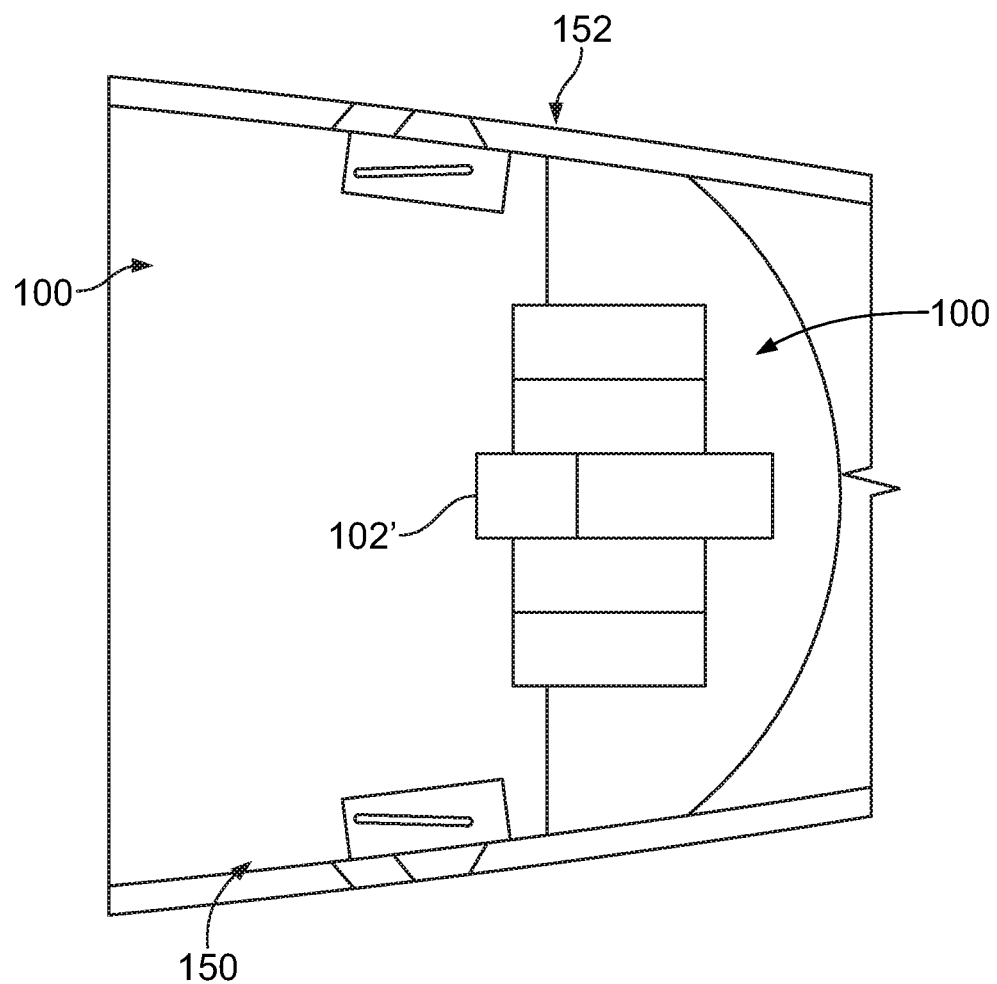
FIG. 16 illustrates a top schematic view of the galley system within an aft section of an internal cabin of an aircraft, according to an embodiment of the present disclosure.
Figure 17:
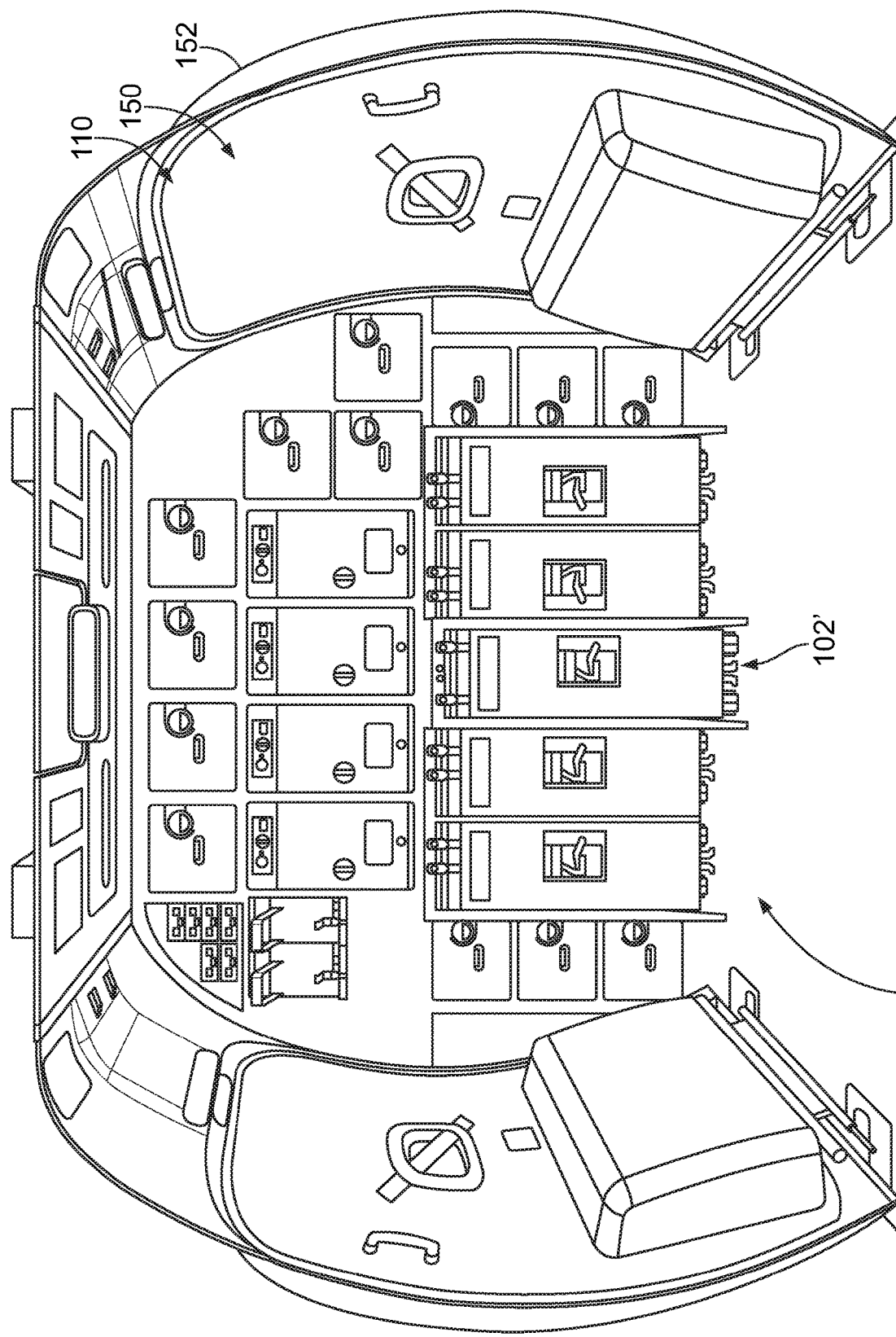
FIG. 17 illustrates a perspective front view of the galley system of FIG. 15 within the aft section of the internal cabin of the aircraft.
Figure 18:
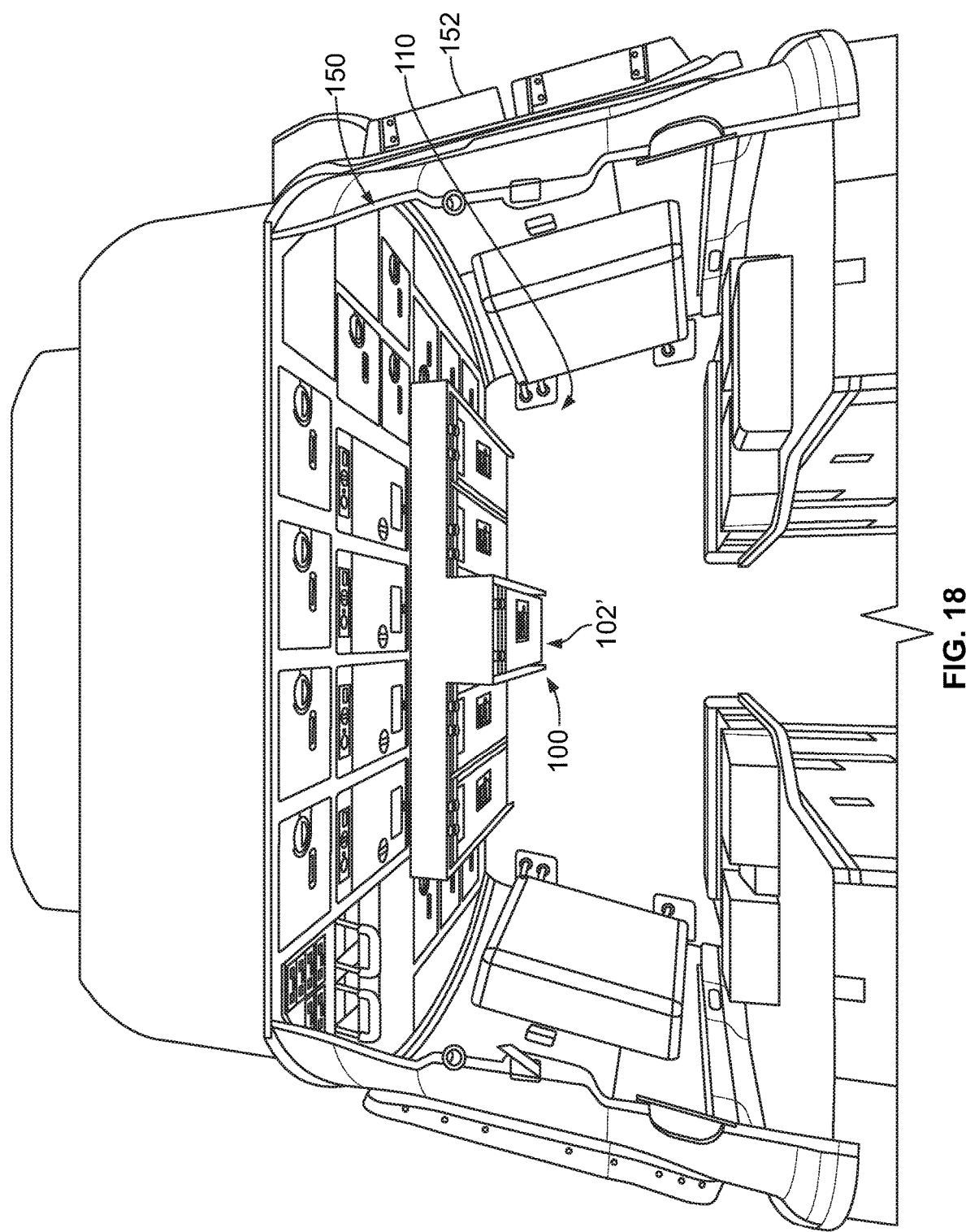
FIG. 18 illustrates a perspective top view of the galley system of FIG. 15 within the aft section of the internal cabin of the aircraft.

FIG. 15 illustrates a perspective front view of a galley system 100, according to an embodiment of the present disclosure. FIG. 16 illustrates a top schematic view of the galley system 100 within an aft section 150 of an internal cabin 110 of an aircraft 152, according to an embodiment of the present disclosure. FIG. 17 illustrates a perspective front view of the galley system 100 of FIG. 15 within the aft section 150 of the internal cabin 110 of the aircraft 152. FIG. 18 illustrates a perspective top view of the galley system 100 of FIG. 15 within the aft section 150 of the internal cabin 110 of the aircraft 152. Referring to FIGS. 15-18, this embodiment is similar to those described above, except that instead of two inboard cart compartments, the galley system 100 may include a single inboard cart compartment 102'. The single inboard cart compartment 102' is able to support one full-size cart and one half-size cart, three half-size carts, or two two-thirds-size carts. Referring to FIGS. 15-18, such an embodiment is similar to those described above, and results in additional stowage or standard container capacity outboard of the outermost compartments, and enables enlarged waste bin volume.

Figure 19:
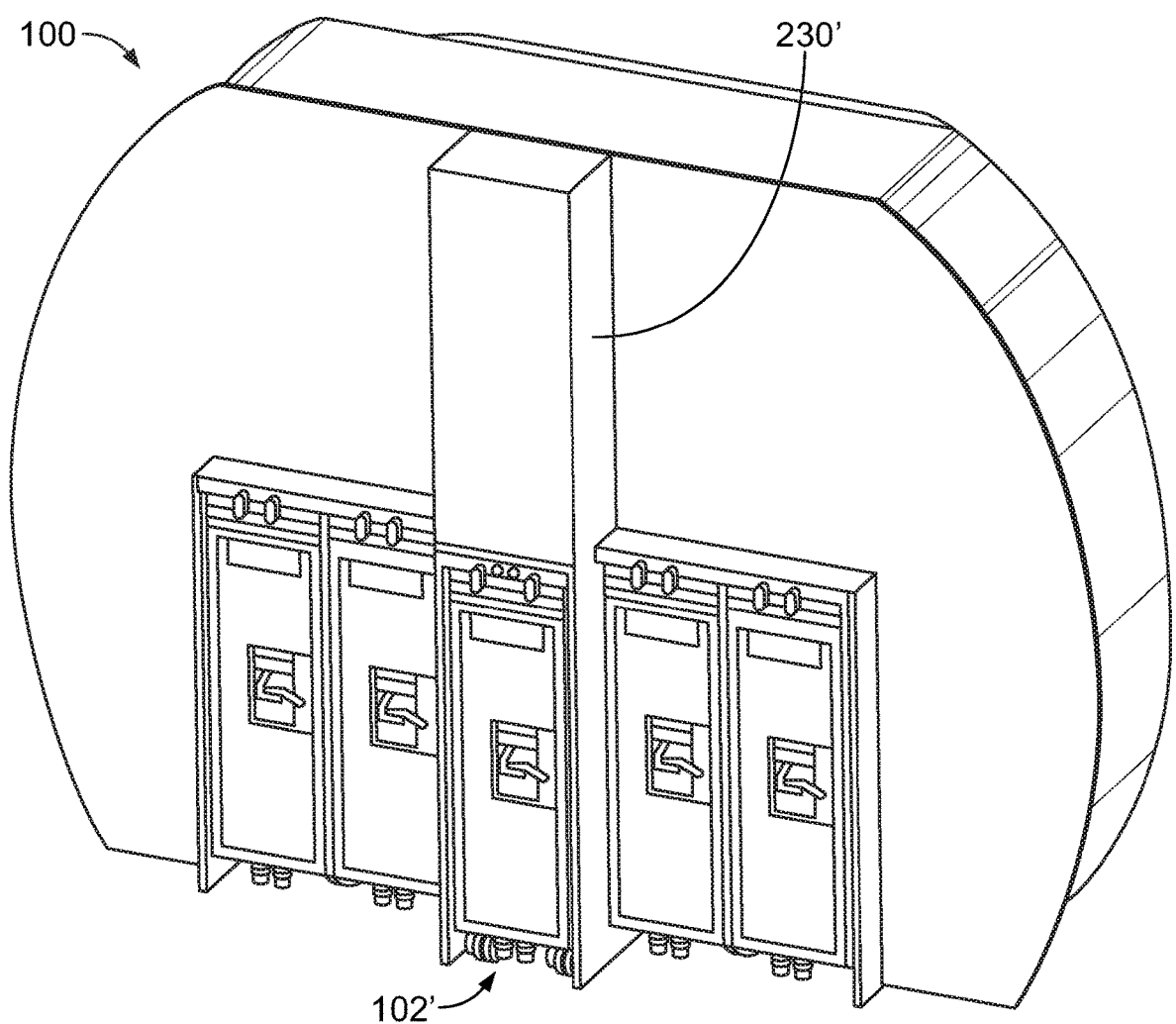
FIG. 19 illustrates a perspective front view of a galley system, according to an embodiment of the present disclosure.
Figure 20:
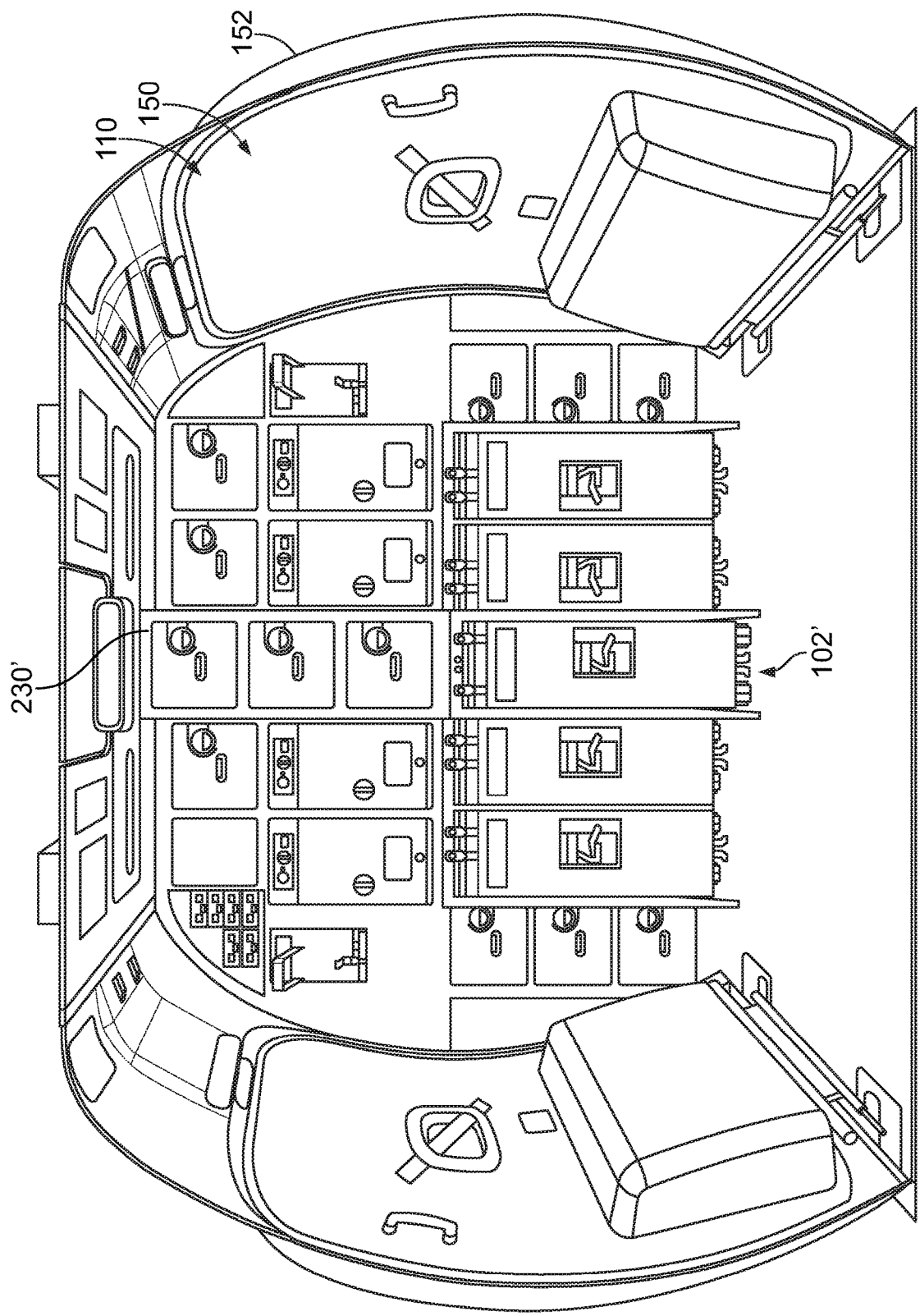
FIG. 20 illustrates a perspective front view of the galley system of FIG. 19 within the aft section of the internal cabin of the aircraft.
Figure 21:
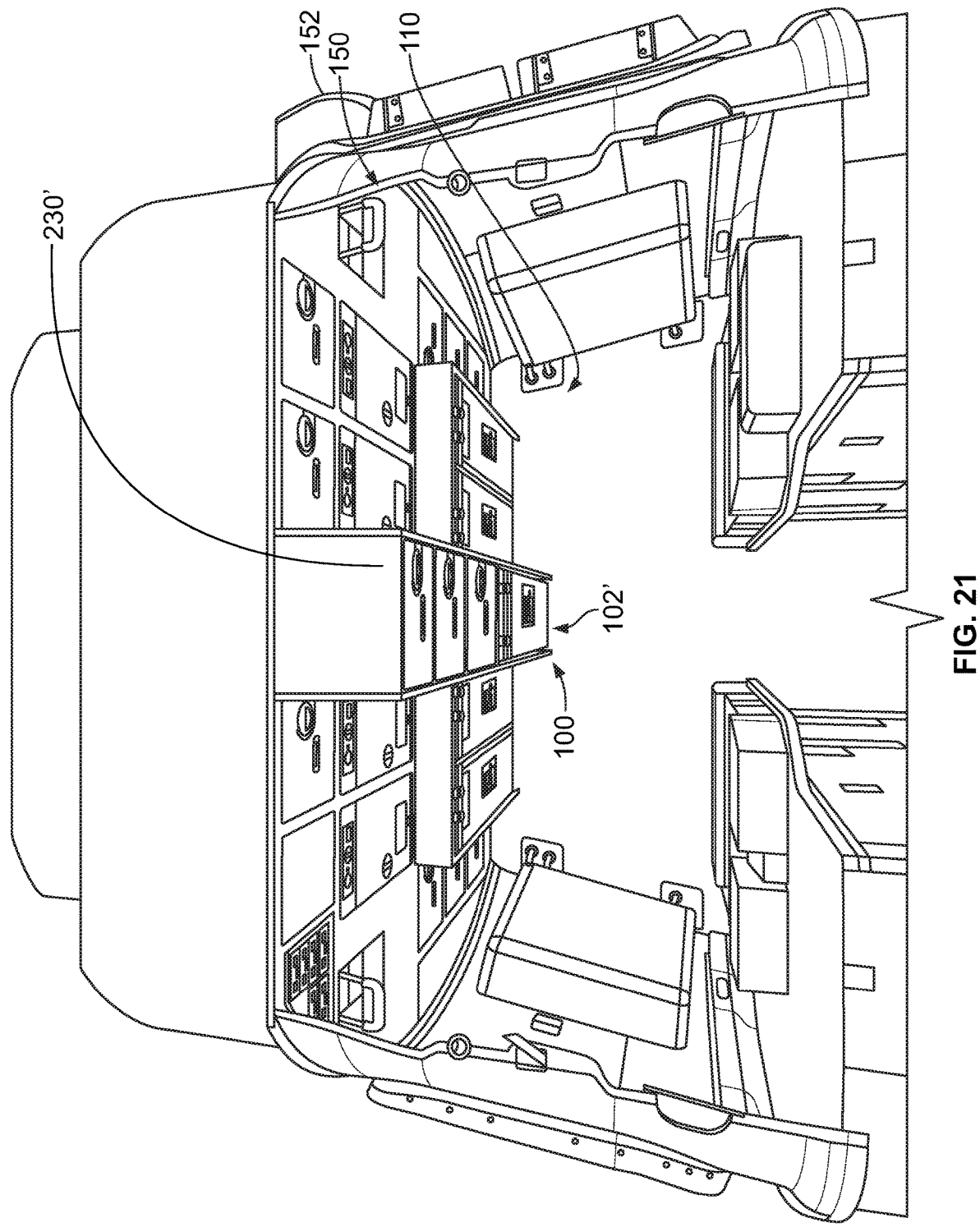
FIG. 21 illustrates a perspective top view of the galley system of FIG. 19 within the aft section of the internal cabin of the aircraft.

FIG. 19 illustrates a perspective front view of a galley system 100, according to an embodiment of the present disclosure. FIG. 20 illustrates a perspective front view of the galley system 100 of FIG. 19 within the aft section 150 of the internal cabin 110 of the aircraft 152. FIG. 21 illustrates a perspective top view of the galley system 100 of FIG. 19 within the aft section 150 of the internal cabin 110 of the aircraft 152. Referring to FIGS. 19-21, this embodiment is similar to the embodiment shown in FIGS. 15-18, except that a cabinet 230' may extend above the single inboard cart compartment 102'.

The additional usable volume enabled by the stored compartment 230' may be utilized for increased stowage capacity, such as miscellaneous stowage compartments or standard container stowage, or may be utilized for electrical inserts, such as ovens, coffee makers, water boilers, and the like. Further, such an extension of the galley structure enables up to two sets of triple-deep standard container stowage, more specifically a galley stowage compartment that allows for back-to-back-to-back standard container stowage within a single chamber. Such an arrangement is enabled by the embodiment of the present enclosure of extending the galley structure above the galley work deck forward in alignment with lower compartments 102a and 102b. The extended structure, such as cabinet 230, may be used with any of the embodiments of the present disclosure in place of a shelf (extended work surface) over the inboard cart compartments 102a and 102b.

Figure 22:
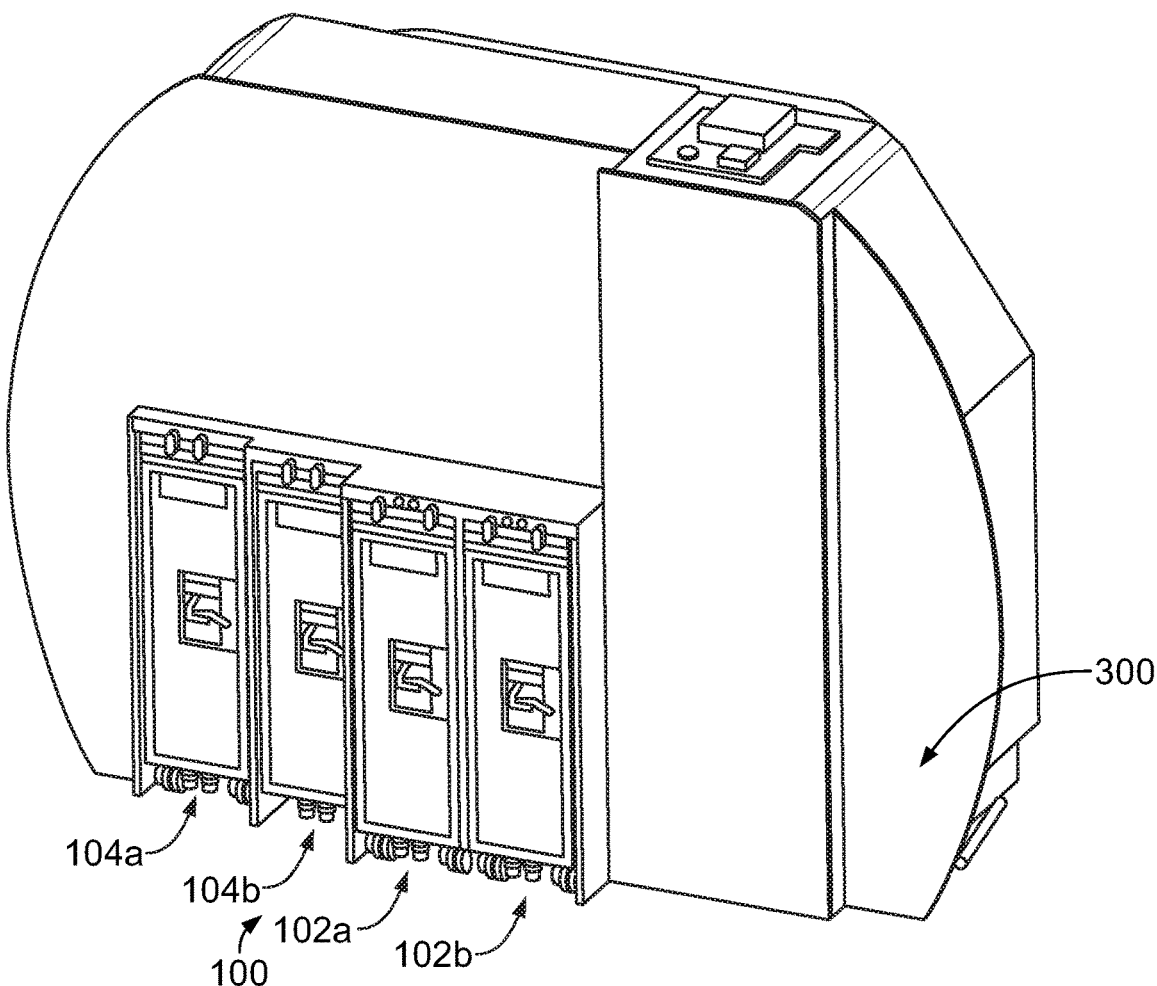
FIG. 22 illustrates a perspective front view of a galley system, according to an embodiment of the present disclosure.
Figure 23:
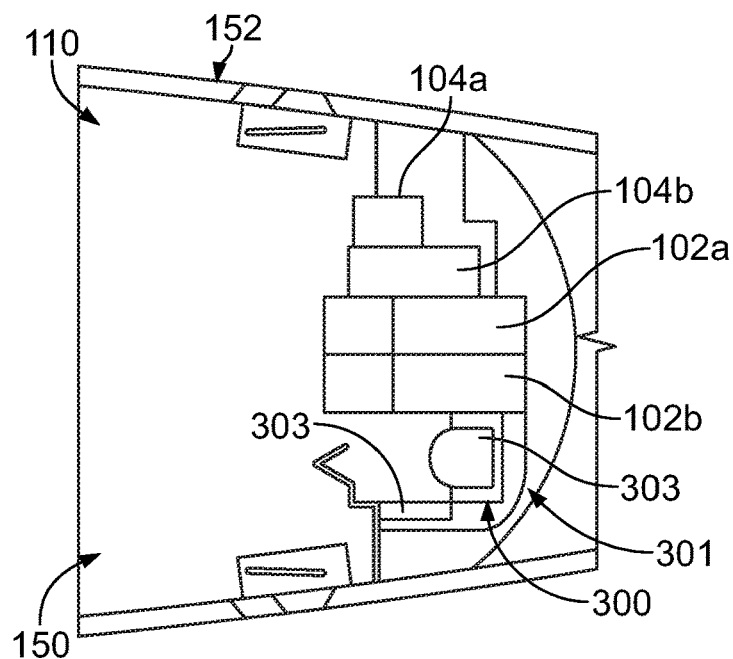
FIG. 23 illustrates a top schematic view of the galley system within an aft section of an internal cabin of an aircraft, according to an embodiment of the present disclosure.
Figure 24:
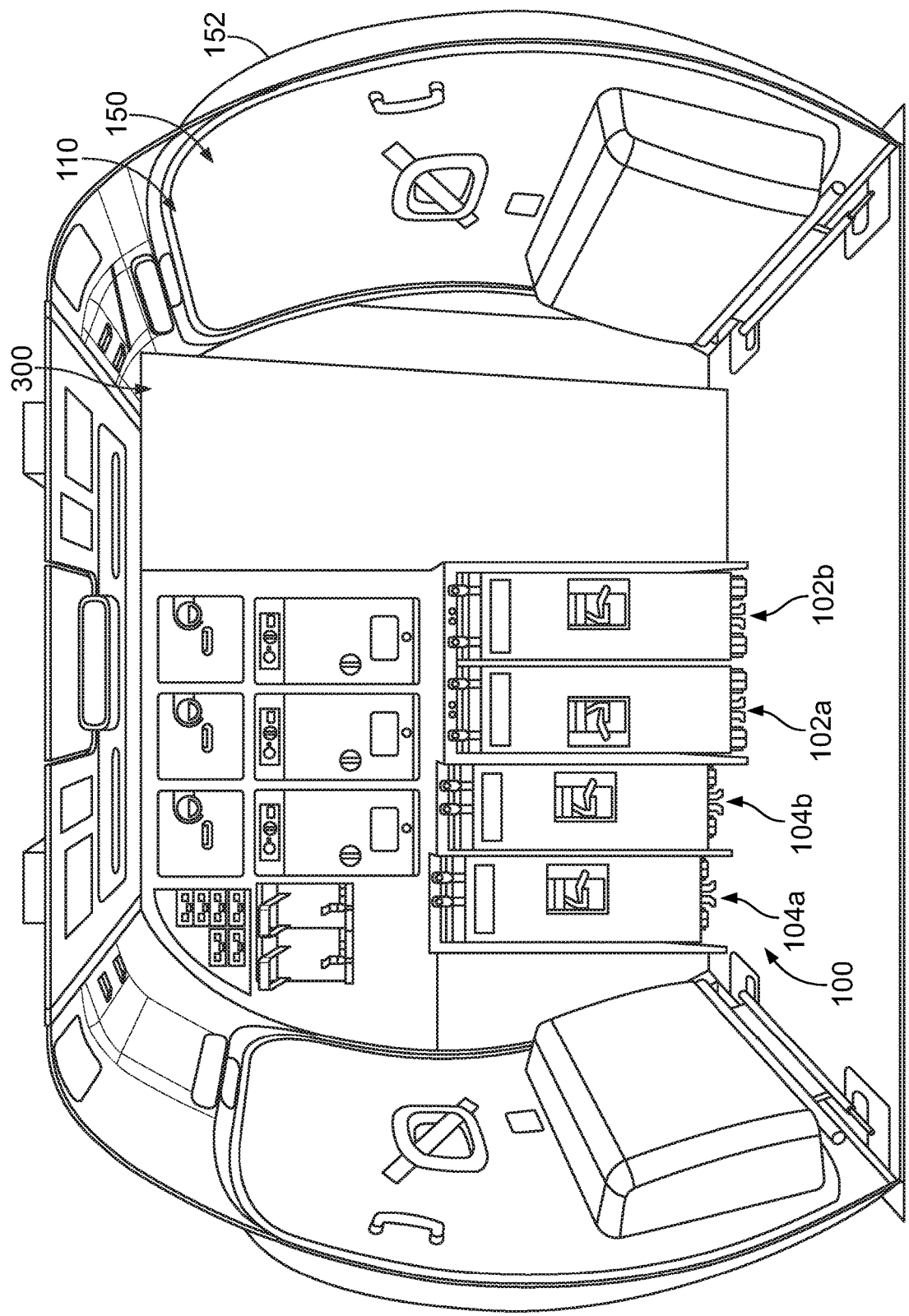
FIG. 24 illustrates a perspective front view of the galley system of FIG. 22 within the aft section of the internal cabin of the aircraft.
Figure 25:
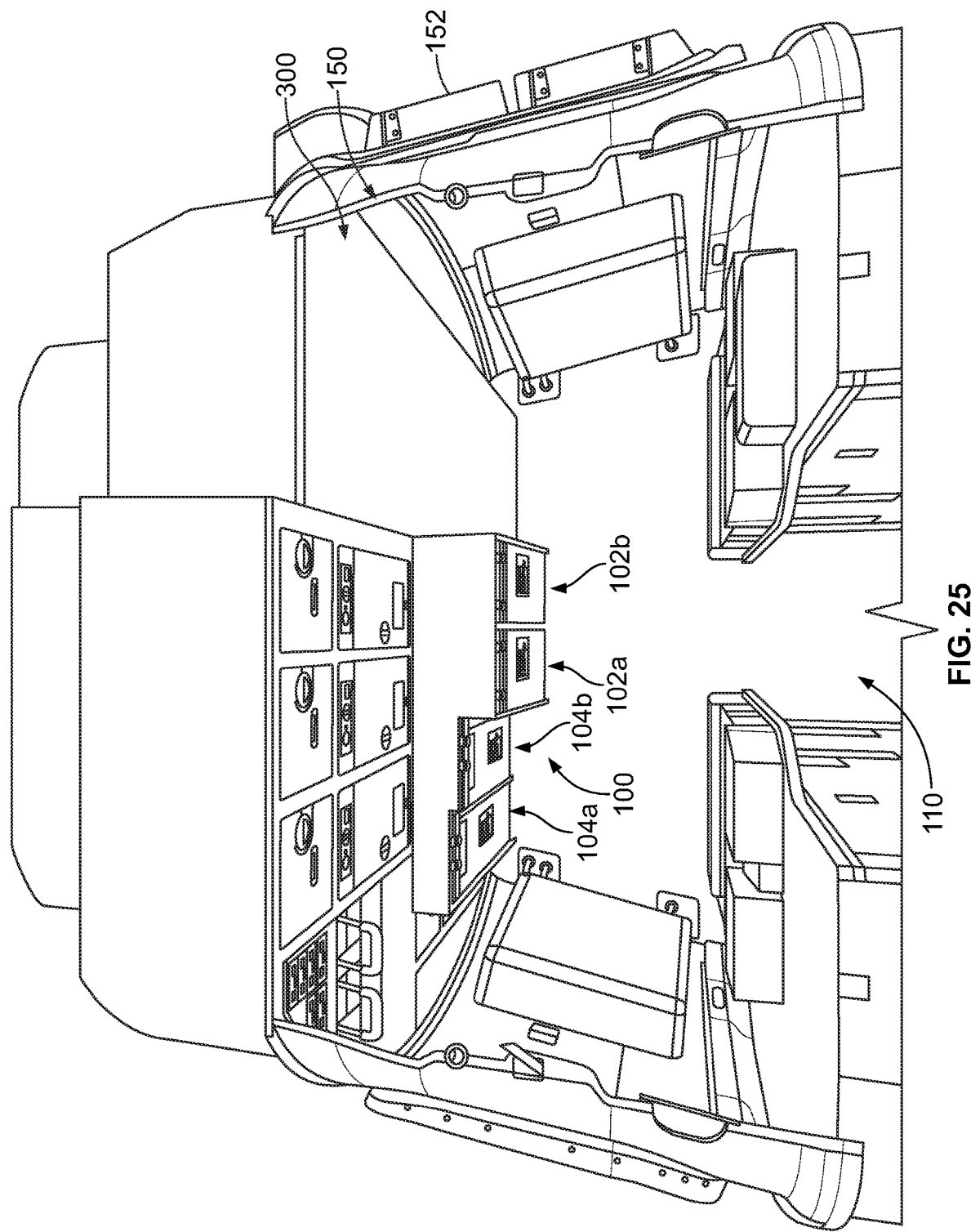
FIG. 25 illustrates a perspective top view of the galley system of FIG. 22 within the aft section of the internal cabin of the aircraft.

FIG. 22 illustrates a perspective front view of a galley system 100, according to an embodiment of the present disclosure. FIG. 23 illustrates a top schematic view of the galley system 100 within an aft section 150 of an internal cabin 110 of an aircraft 152, according to an embodiment of the present disclosure. FIG. 24 illustrates a perspective front view of the galley system 100 of FIG. 22 within the aft section 150 of the internal cabin 110 of the aircraft 152. FIG. 25 illustrates a perspective top view of the galley system 100 of FIG. 22 within the aft section 150 of the internal cabin 110 of the aircraft 152.

Referring to FIGS. 22-25, in this embodiment, a monument 300 may be positioned to a side of the one or more inboard cart compartments 102a and 102b (two are shown, but the galley system 100 may optionally include a single cart compartment). The monument 300 may replace the outboard cart compartments 106a and 106b (shown in FIGS. 3-6, for example), or optionally the outboard cart compartments 104a and 104b, as well as the structure and galley inserts immediately above the work deck in these areas. As such, the galley system 100 includes one or more inboard cart compartments 102a and/or 102b inboard from one or more outboard cart compartments 104a, 104b (or optionally 106a, 106), and the monument 300. The monument 300 may be a lavatory 301 (such as including a toilet 303 and a sink 305), a rest space for an attendant, a closet, a wall, and/or the like. The inboard cart compartments 102a and/or 102b extend forwardly in relation to the monument 300, which does not extend into an egress path.

In at least one embodiment, when the inboard cart compartment 102b is adjacent to a lavatory 301 (as opposed to a closet, crew rest location, or the like), conduits, plumbing, or the like may extend into the inboard cart compartment 102b. As such, the inboard cart compartment 102b may or may not be able to accommodate multiple galley carts. The inboard cart compartment 102b may be configured to house up to one and a half galley carts.

Figure 26:
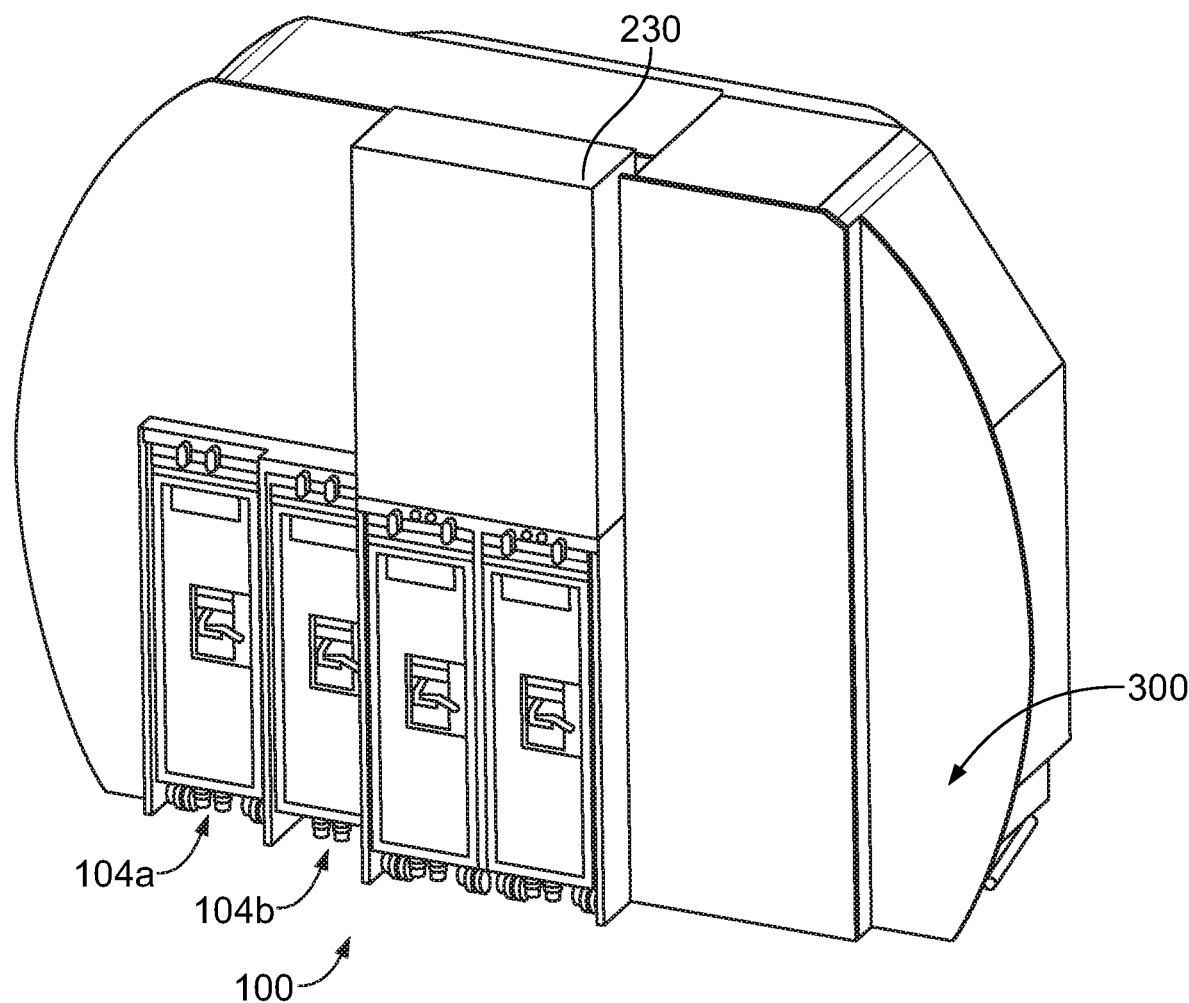
FIG. 26 illustrates a perspective front view of a galley system, according to an embodiment of the present disclosure.
Figure 27:
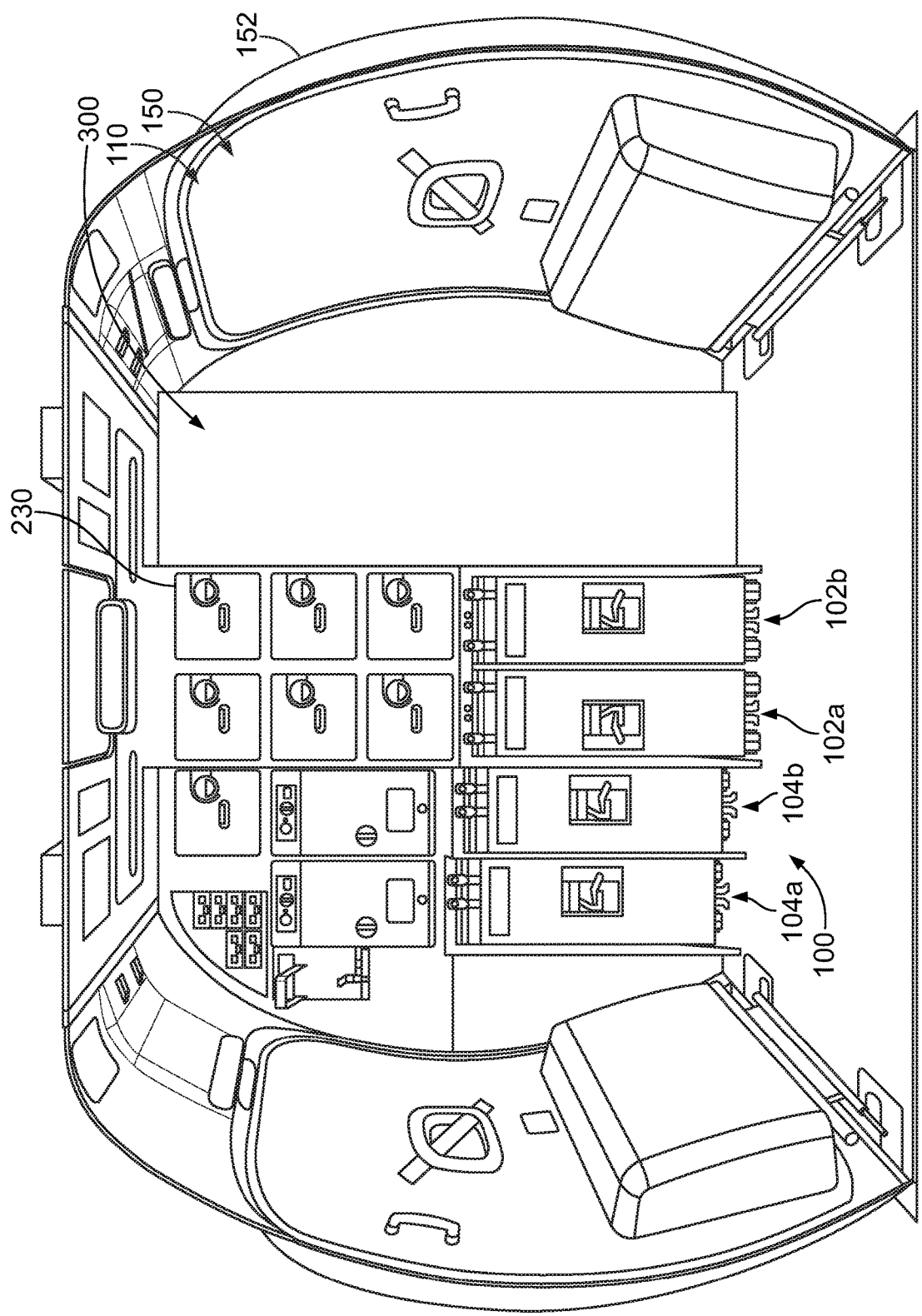
FIG. 27 illustrates a perspective front view of the galley system of FIG. 26 within the aft section of the internal cabin of the aircraft.

FIG. 26 illustrates a perspective front view of a galley system 100, according to an embodiment of the present disclosure. FIG. 27 illustrates a perspective front view of the galley system 100 of FIG. 26 within the aft section 150 of the internal cabin 110 of the aircraft 152. FIG. 28 illustrates a perspective top view of the galley system 100 of FIG. 26 within the aft section 150 of the internal cabin 110 of the aircraft 152. Referring to FIGS. 26-28, this embodiment is similar to the embodiment shown and described with respect to FIGS. 22-25, except that a cabinet 230 may extend above the inboard cart compartments 102a and 102b, as described with respect to FIGS. 12-14.

As described herein, embodiments of the present disclosure provide galley systems that are able to accommodate an increased number of galley carts and/or additional stowage capacity, such as miscellaneous stowage compartments or standard container stowage, or may be utilized for electrical inserts, such as ovens, coffee makers, water boilers, etc.

above the work deck. Further, embodiments of the present disclosure provide galley systems that accommodate additional galley carts without taking up space that may otherwise be used for passenger or attendant seating or other accommodations within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A galley system within an internal cabin of an aircraft, the galley system comprising:
   one or more inboard cart compartments that are configured to removably retain one or more first galley carts;
   one or more first outboard cart compartments disposed to a first side of the one or more inboard cart compartments, wherein the one or more first outboard cart compartments are configured to removably retain one or more second galley carts,
   wherein the one or more inboard cart compartments extend forwardly in relation to the one or more first outboard cart compartments; and
   a contoured scoop coupled to a rear wall of the one or more inboard cart compartments, wherein the contoured scoop comprises:
      a forwardly-angled back panel that angles forwardly from a top edge extending from an upright portion of the rear wall; and
      a lower canted panel connected to the forwardly-angled back panel, wherein the lower canted panel angles further forward from a lower edge of the forwardly-angled back panel.

2. The galley system of claim 1, further comprising one or more second outboard cart compartments disposed to a second side of the one or more inboard cart compartments, wherein the one or more second outboard cart compartments are configured to retain one or more third galley carts, and wherein the one or more inboard cart compartments extend forwardly in relation to the one or more second outboard cart compartments.

3. The galley system of claim 1, wherein the one or more inboard cart compartments comprise two inboard cart compartments.

4. The galley system of claim 1, wherein the one or more first outboard cart compartments comprise two first outboard cart compartments.

5. The galley system of claim 1, wherein the one or more inboard cart compartments extend forwardly towards an aisle of the internal cabin.

6. The galley system of claim 1, wherein the galley system is positioned within an aft section of the internal cabin.

7. The galley system of claim 1, wherein the one or more inboard cart compartments comprises a shelf.

8. The galley system of claim 1, wherein the one or more inboard cart compartments are coaxially aligned with a central longitudinal plane of the internal cabin.

9. The galley system of claim 1, wherein the one or more inboard cart compartments are longer in both a fore direction and an aft direction than the one or more first outboard cart compartments.

10. The galley system of claim 1, further comprising an angled shelf wing extending from a shelf of the one or more inboard cart compartments to the one or more first outboard cart compartments.

11. The galley system of claim 1, further comprising a cabinet extending upwardly from the one or more inboard cart compartments, wherein the cabinet extends forwardly along with the one or more inboard cart compartments.

12. The galley system of claim 1, wherein a non-linear egress path is formed in front of the galley system between aft doors of the aircraft.

13. The galley system of claim 12, wherein a central portion of the egress path extends forwardly into an aisle of the internal cabin.

14. The galley system of claim 1, wherein the one or more inboard cart compartments extend rearwardly in relation to the one or more first outboard cart compartments.

15. The galley system of claim 14, wherein the one or more inboard cart compartments extend rearwardly towards a pressure bulkhead of the aircraft.

16. The galley system of claim 1, wherein the contoured scoop further comprises a flat lower panel connected to the lower canted panel.

17. The galley system of claim 16, wherein the contoured scoop is forward of a clearance boundary of a pressure bulkhead of the internal cabin.

18. The galley system of claim 1, further comprising a monument disposed to a second side of the one or more inboard cart compartments, wherein the second side is opposite from the first side.

19. The galley system of claim 18, wherein the monument comprises a lavatory including a toilet and a sink.

20. An aircraft comprising:
an internal cabin; and
a galley system within the internal cabin, the galley system comprising:
one or more inboard cart compartments that are configured to removably retain one or more first galley carts;
one or more first outboard cart compartments disposed to a first side of the one or more inboard cart compartments, wherein the one or more first outboard cart compartments are configured to removably retain one or more second galley carts,
wherein the one or more inboard cart compartments extend forwardly in relation to the one or more first outboard cart compartments; and
a contoured scoop coupled to a rear wall of the one or more inboard cart compartment, wherein the contoured scoop comprises:
a forwardly-angled back panel that angles forwardly from a top edge extending from an upright portion of the rear wall; and
a lower canted panel connected to the forwardly-angled back panel, wherein the lower canted panel angles further forward from a lower edge of the forwardly-angled back panels.

21. The aircraft of claim 20, wherein the one or more inboard cart compartments extend forwardly towards an aisle of the internal cabin.

22. The aircraft of claim 20, wherein the contoured scoop further comprises a flat lower panel connected to the lower canted panel.

23. The aircraft of claim 20, wherein the contoured scoop is forward of a clearance boundary of a pressure bulkhead of the internal cabin.

24. The aircraft of claim 20, wherein the galley system is positioned within an aft section of the internal cabin.

25. The aircraft of claim 20, wherein a non-linear egress path is formed in front of the galley system between aft doors of the aircraft.

26. The aircraft of claim 25, wherein a central portion of the egress path extends forwardly into an aisle of the internal cabin.

27. The aircraft of claim 20, wherein the one or more inboard cart compartments extend rearwardly in relation to the one or more first outboard cart compartments.

28. The aircraft of claim 27, wherein the one or more inboard cart compartments extend rearwardly towards a pressure bulkhead of the aircraft.

29. An aircraft comprising:
an internal cabin having an aisle extending to an aft section, a non-linear egress path between aft doors, and a pressure bulkhead within the aft section; and
a galley system within the aft section of the internal cabin, the galley system comprising:
one or more inboard cart compartments that are configured to removably retain one or more first galley carts;
one or more first outboard cart compartments disposed to a first side of the one or more inboard cart compartments, wherein the one or more first outboard cart compartments are configured to removably retain one or more second galley carts;
one or more second outboard cart compartments disposed to a second side of the one or more inboard cart compartments, wherein the one or more second outboard cart compartments are configured to retain one or more third galley carts; and
a contoured scoop coupled to a rear wall of the one or more inboard cart compartments, wherein the contoured scoop comprises a forwardly-angled back panel that angles forwardly from a top edge extending from an upright portion of the rear wall; and a lower canted panel connected to the forwardly-angled back panel, wherein the lower canted panel angles further forward from a lower edge of the forwardly-angled back panel,
wherein the one or more inboard cart compartments extend forwardly and rearwardly in relation to the one or more first outboard cart compartments and the one or more second outboard cart compartments,
wherein the one or more inboard cart compartments extend forwardly towards an aisle of the internal cabin,
wherein the one or more inboard cart compartments extend rearwardly towards the pressure bulkhead, and
wherein the non-linear egress path is formed in front of the galley system between the aft doors.

30. The aircraft of claim 29, wherein the contoured scoop further comprises a flat lower panel connected to the lower canted panel.

31. The aircraft of claim 29, wherein the contoured scoop is forward of a clearance boundary of the pressure bulkhead.

* * * * *